United States Patent
Kunishige et al.

(10) Patent No.: US 7,844,176 B2
(45) Date of Patent: Nov. 30, 2010

(54) IMAGING DEVICE, AND CONTROL METHOD FOR IMAGING DEVICE

(75) Inventors: Keiji Kunishige, Hachioji (JP); Satoshi Miyazaki, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 200 days.

(21) Appl. No.: 12/174,901

(22) Filed: Jul. 17, 2008

(65) Prior Publication Data

US 2009/0034955 A1  Feb. 5, 2009

(30) Foreign Application Priority Data

| Aug. 1, 2007 | (JP) | ............................. 2007-201125 |
| Aug. 1, 2007 | (JP) | ............................. 2007-201127 |
| Aug. 3, 2007 | (JP) | ............................. 2007-202554 |
| Aug. 22, 2007 | (JP) | ............................. 2007-216540 |
| Aug. 22, 2007 | (JP) | ............................. 2007-216547 |

(51) Int. Cl.
   *G03B 13/00* (2006.01)
   *H04N 5/232* (2006.01)
(52) U.S. Cl. ..................................... 396/128; 348/353
(58) Field of Classification Search ................. 396/128; 348/353
   See application file for complete search history.

(56) References Cited

U.S. PATENT DOCUMENTS 5,628,036 A * 5/1997 Ozawa et al. ................ 396/102

2008/0118238 A1 * 5/2008 Sogawa et al. .............. 396/128
2009/0051807 A1 * 2/2009 Kunishige et al. ........... 348/353

FOREIGN PATENT DOCUMENTS

JP  2001-285130  10/2001

* cited by examiner

*Primary Examiner*—Rodney E Fuller
(74) *Attorney, Agent, or Firm*—Straub & Pokotylo; John C. Pokotylo

(57) ABSTRACT

An imaging device comprising a first contrast AF unit that obtains contrast information of a subject image from subject image data, and guides a photographing lens to within a first in-focus permissible based on the contrast information; a phase difference AF unit for receiving subject light flux to detect a defocus amount of the photographing lens by the phase difference method, and guiding the photographing lens to within a second in-focus permissible range in response to the detection results; a release button having a two stage operating arrangement of half pressed and fully pressed; and a control unit for, when the release button has been pressed down halfway during execution of the live view display operation, executing a focusing operation using the first contrast AF unit, and, after that, when the release button is pressed down fully, executing a focusing operation using the phase contrast AF unit.

25 Claims, 26 Drawing Sheets enlarged range movement state

⇧ enlargement range movement operation(cross key operation)

enlarged display state

⇧ enlargement switch on full screen display state

AF mode setting menus display screen image sensor light receiving surface liquid crystal monitor screen

IMAGING DEVICE, AND CONTROL METHOD FOR IMAGING DEVICE

Benefit is claimed, under 35 U.S.C. §119, to the filing date of prior Japanese Patent Application Nos. 2007-201125 filed on Aug. 1, 2007, 2007-201127 filed on Aug. 1, 2007, 2007-202554 filed on Aug. 3, 2007, 2007-216540 filed on Aug. 22, 2007, and 2007-216547 filed on Aug. 22, 2007. These applications are expressly incorporated herein by reference. The scope of the present invention is not limited to any requirements of the specific embodiments described in the applications.

BACKGROUND OF THE INVENTION

1. Field of the Invention

The present invention relates to a digital camera having a live view display function, and in detail relates to an imaging device, having a so-called live view display function (also called an electronic viewfinder function) for displaying an image acquired by an image sensor on a display unit, capable of focusing a photographing lens using an image signal during this live view display, and to a control method for an imaging device.

2. Description of the Related Art

In a conventional digital camera, observation of a subject image is performed using an optical viewfinder. Recently however, digital cameras are available on the market that do not have an optical viewfinder, or as well as the optical viewfinder have a live view display function for displaying an image that has been acquired by an image sensor using a display device such as a liquid crystal monitor for subject observation.

A digital camera having this type of live view display function is useful in making subject observation easy because a subject image acquired by the image sensor is displayed directly. However, in a digital single lens reflex camera, in order to carry out live view display a movable mirror that is arranged in the imaging optical path is temporarily retracted, which means that during live view it is no longer possible to use an AF (Auto Focus) mechanism that employs a conventional phase difference method where a defocus amount of the photographing leans is detected using subject light flux that has been reflected by a sub-mirror attached to the moveable mirror.

For example, a digital single lens reflex camera that uses both contrast AF for performing AF by detecting contrast information based on an image signal from an image sensor, and the phase difference method AF, is disclosed in Japanese unexamined patent application No. 2001-281530 (laid-open Oct. 10, 2001). With this digital single lens reflex camera, camera, focusing of the photographing lens is carried out using only contrast AF at the time of performing live view display.

SUMMARY OF THE INVENTION

The present invention has as its object to provide an imaging device that can perform focusing with a small time lag and with high precision in the case of imaging from a live view display function, and a control method for an imaging device.

An imaging device of the present invention comprises: an imaging unit for receiving subject light flux, incident via a photographing lens, on an imaging surface, and photoelectrically converting a subject image that has been formed on the imaging surface to output subject image data; a display unit for carrying out a live view display operation using the subject image data acquired by the imaging unit; a first contrast AF unit that obtains contrast information of the subject image from subject image data, and guides the photographing lens to within a first in-focus permissible range based on the contrast information; a phase difference AF unit for moving a mirror member in the optical path of the photographing lens or arranging the mirror member there, receiving subject light flux reflected by the mirror member to detect a defocus amount of the photographing lens by the phase difference method, and guiding the photographing lens to within a third in-focus permissible range in response to the detection results; a release button having a two stage operating arrangement of half pressed and fully pressed; and a control unit for, when the release button has been pressed down halfway during execution of the live view display operation, executing a focusing operation using the first contrast AF unit, and after that, when the release button is pressed down fully, executing a focusing operation using the phase contrast AF unit.

Also, a control method for a photographing device of the present invention comprises the steps of: imaging a subject, performing live view display of the imaged subject, guiding a photographing lens to a first in-focus permissible range based on contrast information of the subject image in response to a photographing preparation operation, and guiding the photographing lens to a third in-focus permissible range based on defocus information of the photographing lens.

Further, a control method for a photographing device of the present invention comprises the steps of: imaging a subject image, performing live view display of the imaged subject image, guiding a photographing lens to a first in-focus permissible range based on contrast information of the subject image in response to a photographing preparation operation, and guiding the photographing lens to a second in-focus permissible range based on contrast information of the subject image if the photography preparation operation is continued and a shooting operation is not carried out.

DETAILED DESCRIPTION OF THE PREFERRED EMBODIMENTS

Figure 1:
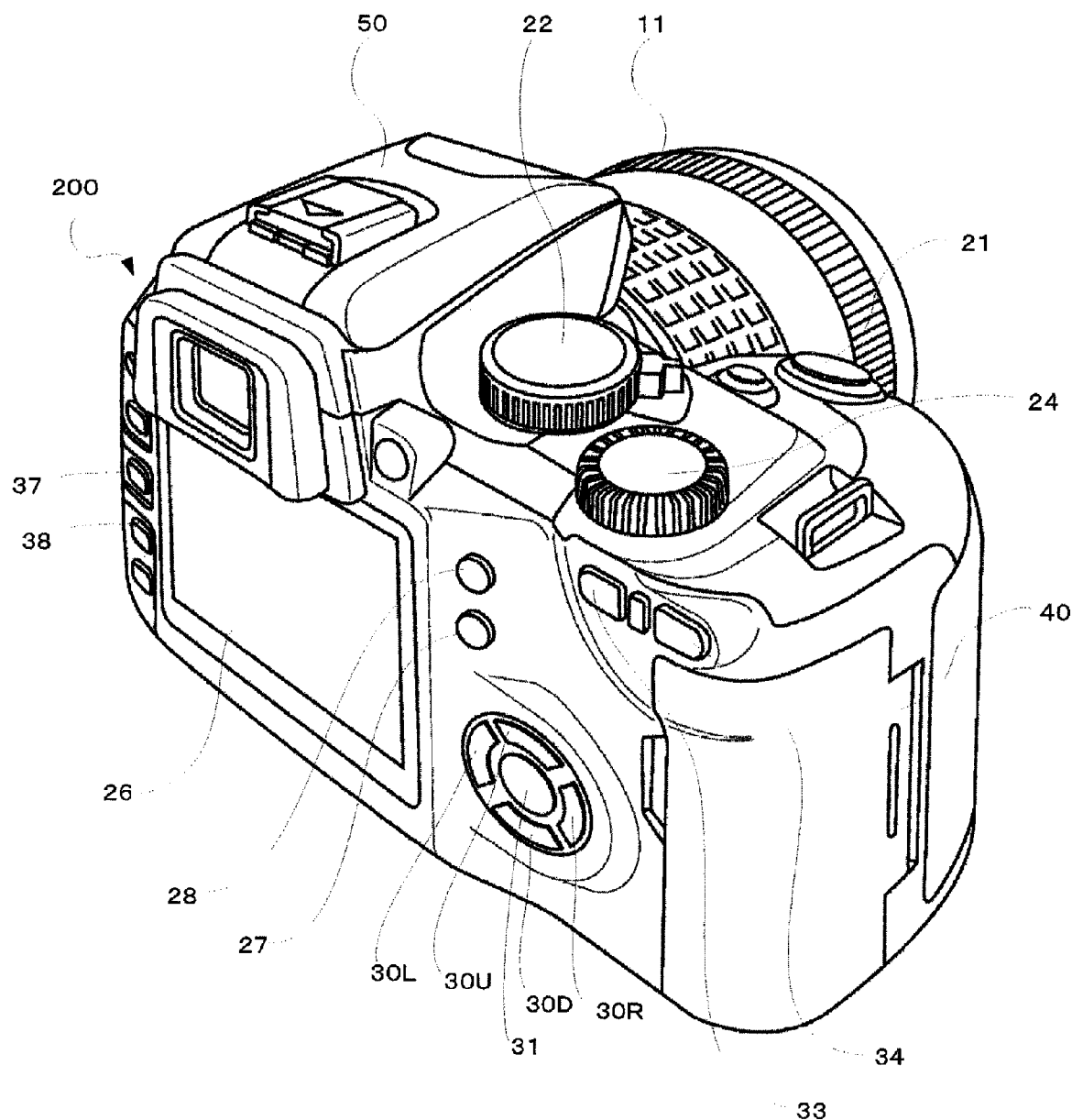
FIG. 1 is an external perspective drawing looking at a digital single lens reflex camera of a first embodiment of the present invention from a rear surface.

In the following, one preferred embodiment using a digital single lens reflex camera adopting the present invention will be described using the drawings. FIG. 1 is an external perspective drawing of a digital single lens reflex camera relating to a first embodiment of the present invention seen from a rear surface.

A release button 21, exposure mode dial 22, information setting dial 24, strobe 50 etc. are arranged on the upper surface of the camera body 200. The release button 21 has a first release switch that turns on if the photographer presses the button down halfway, and a second release switch that is turned on when the button is pressed down fully. By turning this first release switch (hereafter called 1R) on (photographing preparation operation), the camera carries out exposure preparation operations such as focal point detection, focusing of the photographing lens, and light measurements for the subject brightness, and by turning the second switch (hereafter called 2R) on (photographing operation), an shooting operation is carried out to acquire image data for a subject image based on output of the image sensor 221 (refer to FIG. 2).

The exposure mode dial 22 is an operation member constructed capable of rotation, and by aligning a pictorial display or symbol representing an exposure mode provided on the exposure mode dial 22 with an index, it is possible to select respective exposure modes, such as full auto exposure mode (AUTO), program exposure mode (P), aperture priority exposure mode (A), shutter priority exposure mode (S), manual exposure mode (M), portrait exposure mode, landscape exposure mode, macro exposure mode, sports exposure mode or night scene exposure mode.

An information setting dial 24 is an operation member constructed capable of rotation, and it is possible to select desired setting values and modes etc. on an information display screen or the like by rotational operation of the information setting dial 24. The strobe 50 is a pop-up type supplemental lighting unit, and by operating an operating button, not shown, the strobe 50 pops up and is capable of irradiating light to a subject.

A liquid crystal monitor 26, continuous/single shot button 27, AF lock button 28, a cross-shaped button for up 30U, a cross-shaped button for down 30D, a cross-shaped button for right 30R, a cross-shaped button for left 30L, (if these buttons 30U, 30D, 30R and 30L are referred to collectively, it will be called a cross button 30), an OK button 31, a live view display button 33, an enlarge button 34, a menu button 37 and a playback button 38 are arranged on the rear surface of the camera body 200. The liquid crystal monitor 26 is a display unit for carrying out live view display, playback display of a subject images that have already been taken, and display of exposure information and menus. The display device is not limited to a liquid crystal display as long as it is possible to perform these display operations.

The continuous/single shot button 27 is an operation member switching between continuous shooting mode where pictures are taken continuously while the release button 21 is fully pressed down, and single shot mode where a single picture is taken if the release button 21 is pressed down fully. The AF lock button is an operation member for fixing the focus point of the subject. If the subject of a picture to be taken is focused on, and the AF lock button 28 is operated in this state and the focus point fixed, it is possible take a picture with the subject still in focus, even if the composition is changed.

The cross button 30 is an operation member for instructing movement of a cursor in two dimensional directions, the X direction and Y direction, on the liquid crystal display monitor 26, and is also used in selection commands for a subject image, when performing playback display of subject images that have been stored in the storage medium 277 (refer to FIG. 2) etc. Besides providing the four buttons for up, down, left and right, it is also possible to replace with a touch switch. The OK button 31 is an operation member for confirming various items selected by the cross button 30 and the control dial 24 etc.

The live view display button 33 is an operating button for switching to live view display from a display screen for information display etc., and switching from live view display to a display screen for information display etc. Live view display is a mode that display a subject image for viewing on the liquid crystal monitor 26 based on output of the image sensor 221 for subject image storage, and information display is a mode for displaying digital camera exposure information on the liquid crystal monitor 26. The enlargement button 34 is an operation member for enlarging display of part of a subject image on the liquid crystal monitor 26, and it is possible to change the enlargement position by operation of the above-described cross button 30.

The menu button 37 is an operation member for switching to menu mode in order to set various modes of the digital camera, and if menu mode is selected by operation of this menu button 37 a menu screen is displayed on the liquid crystal monitor 26. The menu screen is comprised of a multiple hierarchical structure, and various items are selected using the cross button 30 and selection is determined by operating the OK button 31. The playback button 38 is an operation button for instructing display of subject images, that have been stored after being taken, on the liquid crystal monitor 26. If a command for playback display is issued, image data of subjects stored in a compressed mode such as JPEG, for example, in SDRAM 267 and a storage medium 277, that will be described later, is expanded.

A storage medium housing cover 40 is attached to the side surface of the camera body 200. If the storage medium cover 40 is opened, a slot for fitting the storage medium 227 is provided inside, and the storage medium 227 can be loaded into or removed from the camera body 200.

Next, the overall structure principally involved in the electrical systems of the digital single lens reflex camera will be described using FIG. 2. The digital single lens reflex camera relating to this embodiment comprises an interchangeable lens 100 and a camera body 200. With this embodiment, the interchangeable lens 100 and the camera body 200 are constructed as separate bodies, electrically connected by means of a communication contact 300, but it is also possible to integrally construct the interchangeable lens 100 and the camera body 200. A circuit block for the built-in strobe 50 is omitted from FIG. 2.

A photographing optical system 101 for focusing and focal length adjustment, and an aperture 103 for adjusting aperture value, are arranged inside the interchangeable lens 100. The photographing optical system 101 is driven by an optical system drive mechanism 107, while the aperture 103 is driven by the aperture drive mechanism 109. Focal length and focus position of the photographing optical system 101 that has been driven by the optical system drive mechanism 107 are detected by an optical system position detection mechanism 105.

The lens drive mechanism 107, the aperture drive mechanism 109 and the optical system position detection mechanism 105 are respectively connected to a lens CPU 111, and this lens CPU 111 is connected to the camera body 200 by means of the communication contact 300. The lens CPU 111 performs control inside of the interchangeable lens 100, controls the optical system drive mechanism 107 to perform focusing and zoom operations, and controls an aperture value by controlling the aperture drive mechanism 109. Also, the lens CPU 111 transmits the focal length and focus position information detected by the optical system position detection mechanism 105 to the camera body 200.

Inside the camera body 200, a rotatable moving mirror 201 is provided moving between a position inclined by 45 degrees with respect to the lens optical axis for reflecting a subject image to a viewfinder optical system (lowered position, subject image viewing position), and a raised up position for guiding the subject image to the image sensor 221 (raised position, retracted position). A focusing screen 205 for image forming the subject image is arranged above the movable mirror, and a pentaprism 207 for lateral inversion of the subject image is arranged above this focusing screen 205.

An ocular lens (not shown) for viewing the subject image is arranged at an outgoing side of this pentaprism 207 (the right side in FIG. 2), and a photosensor 211 is arranged next to the ocular lens at a position that does not obstruct viewing of the subject image. This photosensor 211 is connected to a metering processing circuit 241, and output of the photosensor 211 is subjected to processing such as amplification processing and analog-digital conversion by this metering processing circuit 241.

A half mirror is constructed close to the middle of the movable mirror 201, and a sub-mirror 203 for reflecting the subject image that has passed through the half mirror to a lower section of the camera body 200 is provided on a rear surface of the movable mirror 201. This sub mirror 203 is capable of rotation with respect to the moving mirror 201, and when the moving mirror 201 is raised up (position shown by dotted lines in FIG. 2) the sub mirror 203 rotates to a position covering the half mirror part, while when the moving mirror 201 is in a subject image viewing position (lowered position) the sub-mirror 203 is at a position opened with respect to the moving mirror 201, as shown in the drawing.

This movable mirror 201 is driven by a movable mirror drive mechanism 239. Also, a phase difference AF sensor 243 is arranged below the sub-mirror 203, and output of this phase difference AF sensor 243 is connected to a phase difference AF processing circuit 245. The phase difference AF sensor 243 measure defocus amount for a subject image formed using the photographing optical system 101, and is constructed of a well-known phase difference AF optical system for separating peripheral light of the photographing optical system 101 into two luminous fluxes, and a pair of sensors. Also, the phase difference AF sensor 243 is capable of detecting respective focus points for a plurality of points within an exposure screen.

A focal plane type shutter 213 for exposure time control is arranged behind the movable mirror 201, and drive control for this shutter 213 is performed by a shutter drive mechanism 237. An image sensor 221 is arranged behind the shutter 213, and a subject image formed by the photographing optical system 101 is photoelectrically converted into electrical signals. It goes without saying that it is possible to use CCD (Charge Coupled Devices), or a two-dimensional imaging element such as CMOS (Complementary Metal Oxide Semiconductor) as the image sensor 211.

The image sensor 221 is connected to an image sensor drive circuit 223, and readout of image signals from the image sensor 221 etc. is performed by this image sensor drive circuit 223. The image sensor drive circuit 223 is connected to a pre-processing circuit 225, and the pre-processing circuit 225 performs pixel thinning processing for live view display, and pre-processing for image processing such as cropping processing for enlarged display.

A dust protection filter 215, piezoelectric element 216, and infrared cut filter/low pass filter 217 are arranged between the shutter 213 and the image sensor 221. The piezoelectric element 216 is provided around the edge of the dust protection filter 215, and this piezoelectric element 216 is vibrated with ultrasonic waves by a dust protection filter drive circuit 235. Dust that has become adhered to the dust protection filter 225 is removed by the vibration waves generated in the piezoelectric element 216.

The infrared cut/low pass filter 217 is an optical filter for removing an infrared component and a high frequency component from subject light flux. The dust protection filter 215, piezoelectric element 216, infrared cut/low pass filter 217 and image sensor 221 are formed integrated in an airtight fashion so that that dust does not infiltrate. The integrated image sensor 221 etc. can be respectively driven in the X-axis direction and Y-axis direction of the image plane of the image sensor 221 by a shift mechanism 233.

A hand-shake sensor 227 is a sensor for detecting vibration caused by hand vibration applied to the camera body 200 etc., and output of this sensor is connected to an image stabilization circuit 229. The image stabilization circuit 229 generates image stabilization signals for removing vibrations such as handshake, and output of the image stabilization circuit 229 is connected to a shift mechanism drive circuit 231. The shift mechanism drive circuit 231 receives input of an image stabilization signal, and drives the shift mechanism 233 based on this signal. Using the shift mechanism 233 the image sensor 221 etc. are driven so as to negate vibrations such as hand-shake that are applied to the camera body 200, to perform vibration prevention.

The pre-processing circuit 225 is connected to data bus 252 inside an ASIC (Application Specific Integrated Circuit) 250. A sequence controller (hereafter referred to as a body CPU) 251, image processing circuit 257, compression and expansion circuit 259, video signal output circuit 261, SDRAM control circuit 265, input/output circuit 271, communication circuit 273, storage medium control circuit 275, flash memory control circuit 279 and switch sensing circuit 283 are connected to this data bus 252.

The body CPU 251 that is connected to the data bus 252 controls operation of this digital single lens reflex camera. A contrast AF circuit 253 and an AE circuit 255 are connected in parallel between the pre-processing circuit 225 and the body CPU 251. The contrast AF circuit 253 extracts a high frequency component based on an image signal output from the pre-processing circuit 225, and outputs contrast information to the body CPU 251 based on this high frequency information. The AE circuit 255 outputs photometry information according to subject brightness to the body CPU 251 based on the image signal output from the pre-processing circuit 225.

The image processing circuit 257 is connected to the data bus 252 carries out various image processing such as digital amplification of digital image data (digital gain adjustment processing), color correction, gamma (γ) correction, contrast correction, and image generation for live view display etc. Also, the compression and expansion circuit 259 is a circuit for compressing image data stored in the SDRAM 267 using a compression system such as JPEG, TIFF etc. The image compression is not limited to JPEG and TIFF, and it is also possible to apply other compression systems.

The video signal output circuit 261 is connected to a liquid crystal monitor 26 via a liquid crystal monitor drive circuit 263. The video signal output section 261 converts image data stored in the SDRAM 267 or the storage medium 277 into video signals for display on the liquid crystal monitor 26. The liquid crystal monitor 26 is arranged on the rear surface of the camera body 200 as shown in FIG. 1, but as long as it is in a position that can be seen by the photographer it is not limited to the rear surface, and also is not limited to a liquid crystal display and can be another display device.

The SDRAM 267 is connected via the SDRAM control circuit 265 to the data bus 261, and this SDRAM 267 acts as a buffer memory for temporarily storing image data that has been subjected to image processing by the image processing circuit 257 or image data that has been compressed by the compression and expansion circuit 259.

The input/output circuit 271 connected to the above described image sensor drive circuit 223, pre-processing circuit 225, image stabilization circuit 229, shift mechanism drive circuit 231, dust protection filter drive circuit 235, shutter drive mechanism 237, movable mirror drive mechanism 239, metering processing circuit 241, and phase difference AF processing circuit 245 controls input and output of data to various circuits, such as the body CPU 252 via the data bus 251.

The communication circuit 273 that is connected to the lens CPU 111 via the communication contact 300 is also connected to the data bus 252, and carries out data exchange with the body CPU 251 etc. and communication for control commands. The storage medium control circuit 275 connected to the data bus 252 is connected to the storage medium 277, and performs control of storing image data etc. to this storage medium 277 and reading of image data etc.

The storage medium 277 is constructed so that any rewritable storage medium, such as xD picture card (registered trademark), Compact Flash (registered trademark), SD memory card (registered trademark) or memory stick (registered trademark) can be fitted, and is removably inserted into the camera body 200. Besides, it is also possible to have a configuration where it is possible to connect to a hard disc via a communication connection point.

The flash memory control circuit 279 is connected to a flash memory 281, and this flash memory 281 stores programs for controlling operation of the digital single lens reflex camera, and the body CPU 251 performs control of the digital single lens reflex camera in accordance with the programs stored in the flash memory 281. Incidentally, the flash memory 281 is an electrically rewritable non-volatile memory.

Various switches 285, including a 1R switch for detecting a first stroke (half pressing) of the shutter release button 21, a 2R switch for detecting a second stroke (full pressing), and a live view display switch that is turned on by operation of the live view display button 33, are connected to the data bus 252 via a switch detection circuit 283. As the various switches 285 there are also an enlargement switch linking to an enlargement button 34, a power switch, a menu switch linking to a menu button 37, an AF lock switch linking to an AF lock button 28, a continuous shooting/single shot switch linking to a continuous shooting/single shot button 27, and various other switches linking to other operation members.

Figure 3:
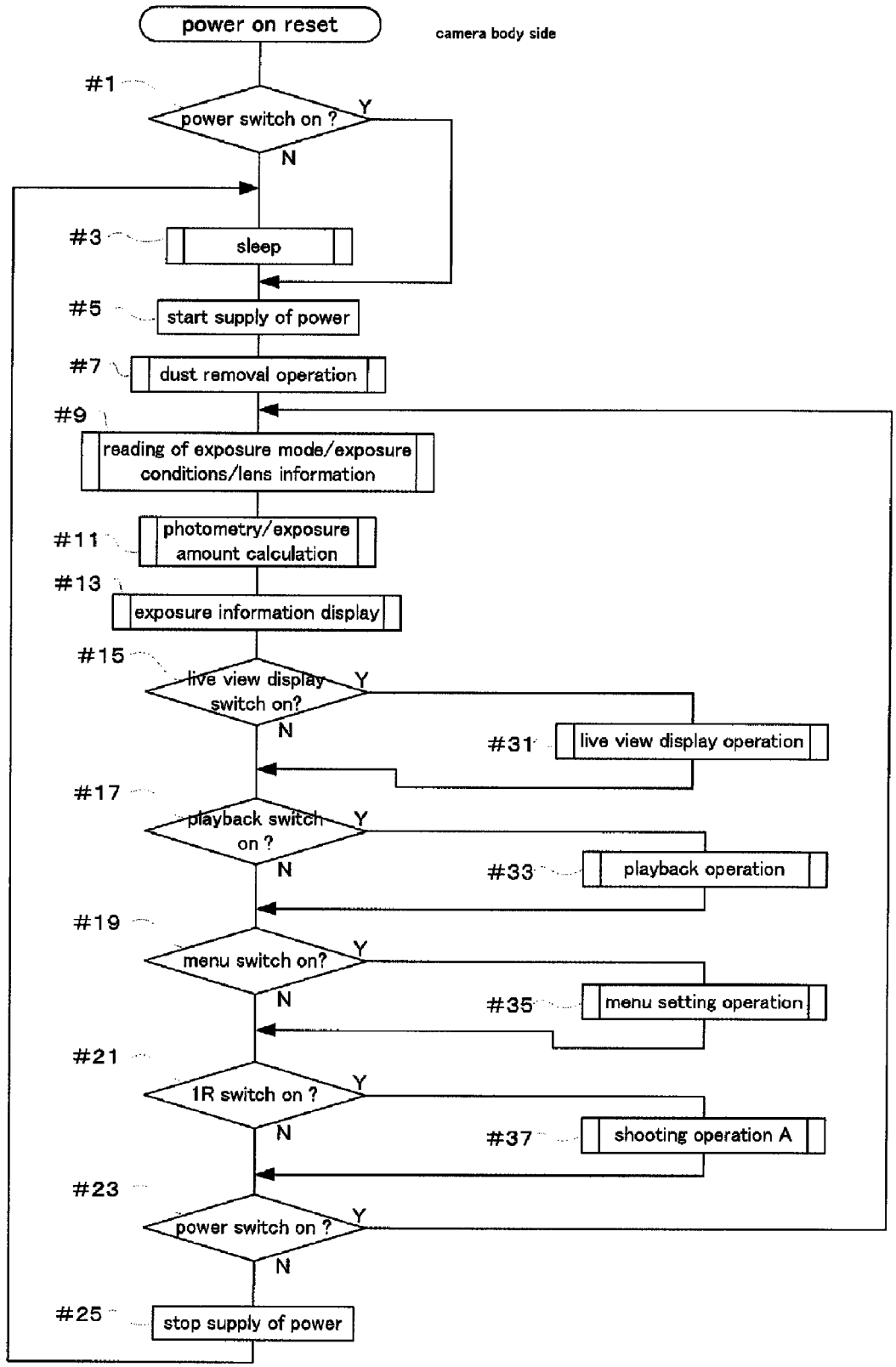
FIG. 3 is a flowchart showing a power-on reset operation, in the camera body, of the first embodiment of the present invention.

Next, operation of the digital camera of a first embodiment of the present invention will be described using the flowcharts shown in FIG. 3 to FIG. 12. FIG. 3 shows a power on reset operation performed by the body CPU 251 at the camera body 200 side. If a battery is fitted into the camera body 200, this flow of operations starts, and the first thing that happens is that it is determined whether the power switch of the camera body 200 is on (#1).

When the result of determination is that the power switch is off, a sleep state, which is a low power consumption state, is entered (#3). In this sleep state, interrupt processing is carried out only when the power switch is turned on, and processing for power switch on is carried out in steps #5 and after. Until the power switch is turned on, operations other than power switch interrupt processing are suspended, and consumption of the power supply battery is prevented.

In the event that the power switch was on in step #1, or the sleep state of step #3 is left, supply of power commences (#5). Next, the dust removal operation for the dust protection filter 215 is carried out (#7). This is an operation to apply drive voltage to the piezoelectric element 216 attached to the dust protection filter 215 from the dust protection filter drive circuit 235, and remove dust using ultrasonic vibration waves.

Next, if there is information such as program exposure mode or macro exposure mode set by the exposure mode dial 22 etc., ISO speed or shutter speed set manually, or aperture value, reading in of these exposure conditions and lens information is carried out (#9). Reading of lens information is the reading of lens characteristic information, such as maximum aperture, focal length information, and a lens identification signal, and interchangeable lens type, such as macro lens; of an interchangeable lens 100 from the lens CPU 111 by means of the communication circuit 273.

Next, photometry and exposure value calculation are carried out (#11). In this step, subject brightness is then measured by the photosensor 211, exposure amount is calculated, and exposure control values such as shutter speed and aperture value are calculated in accordance with exposure mode and exposure conditions, using this exposure value. After that, the exposure information is displayed on the liquid crystal monitor 26 (#13). As exposure information, there are exposure mode and exposure conditions read in step #9 and exposure control values for shutter speed and aperture value calculated in #11.

It is next determined whether or not the live view display switch is on (#15). As described previously, if the photographer is observing a subject image in live view display, the live view display button 33 is operated. If the result of determination is that the live view display switch is on, a subroutine for live view display operation is executed (#31). This live view display operation will be described later using FIG. 4 to FIG. 6.

If the result of determination in step #15 is that the live view display switch is not on, it is determined whether or not the playback switch is on (#17). Playback mode is a mode for reading out still images stored in the storage medium 277 and displaying them on the liquid crystal monitor 26, when the playback button 38 has been operated. If the result of determination is that the playback switch is on, a playback operation is executed (#33).

If the result of determination in #17 is that the playback switch is not on, it is determined whether or not the menu switch is on (#19). In this step, it is determined whether or not the menu button 37 has been operated and the menu mode has been set. If the result of determination is that the menu switch is on, menu display is performed on the liquid crystal monitor 26, and a menu setting operation is carried out (#35). Various setting operations such as AF mode, white balance, ISO speed setting, drive mode setting etc. can be carried out by the menu setting operation.

If the determination result in step #19 is that menu switch is not on, it is next determined whether or not the release button 21 has been pressed down halfway (exposure preparation operation), that is, whether or not the 1R switch is on (#21). If the result of determination is that the 1R switch is on, a shooting operation A sub-routine is executed to carry out exposure preparation and exposure (#37). This sub-routine will be described in detail later using FIG. 7.

If the result of determination in step #21 is that the 1R switch is not on, then similarly to step #1 it is determined whether or not the power switch is on (#23). If the result of determination is that the power switch is on, processing returns to step #9 and the operations described above are repeated. On the other hand, if the power switch is not on, supply of power is stopped (#25), and processing returns to step #3 where the previously described sleep state is entered.

Next, the live view display operation of step #31 will be described using FIG. 4 to FIG. 6. If this subroutine is entered, first of all exposure information display is turned off (#41). In step #13, exposure information is displayed on the liquid crystal monitor 26, but in this step display of this exposure information is stopped in order to display live view on the liquid crystal monitor 26. Then, similarly to step #11, photometry and exposure amount calculation are performed (#43).

Next, the movable mirror 201 is retracted from the optical path of the photographing optical system 101 (#45), and the shutter 213 is opened (#45). As a result of these operations, a subject image is formed on the image sensor 221 by the photographing optical system 101. Next, live view condition initial setting is carried out (#49). In this step, in order to carry out condition setting for electronic shutter speed and sensitivity when driving the image sensor 221, calculation and setting is carried out in order to display an image having an appropriate brightness on the liquid crystal monitor 26 using results of calculation for light measurement and exposure amount obtained in step #43.

Next, start of live view display is instructed (#51). Specifically, the live view instruction is issued to the image sensor 221 and the image processing circuit 257, and image data acquired by the image sensor 221 is displayed as a moving image on the liquid crystal monitor 26. The photographer can then decide on photo composition based on this live view display. The electronic shutter speed and ISO sensitivity etc. are controlled so that screen brightness of the liquid crystal monitor 26 remains constant during live view display.

If live view display is started, it is next determined whether or not the release button 21 has been pressed down halfway, that is, whether or not the 1R switch is on (#53). If the result of determination is that the 1R switch is not on, it is determined whether or not the enlargement button 34 has been operated, specifically, whether or not the enlargement switch is on (#55). If the result of determination is that the enlargement switch is not on, processing jumps to step #71 (FIG. 5), while if the enlargement switch is on it is determined whether or not enlarged display is being performed (#57).

As previously described, the enlargement button 34 is an operation button for displaying the subject image in enlarged format, in the live view display mode, and if it is operated once an enlarged display mode is entered, and if it is operated again the enlarged mode is released. Accordingly, in step #57 it is determined whether the enlarged display mode is continued or finished.

If the result of determination in step #57 is that enlarged display was not in progress, that is, that there has been a transition from non-enlarged display (normal live view display) to enlarged display mode an instruction for cropping range is issued (#59) and start of enlarged display is instructed (#61). Enlarged display is instructed to the pre-processing circuit 225, and is carried out by cropping image data corresponding to an enlargement range from within image data that has been read from the image sensor 221.

If the result of determination in step #57 is that enlarged display is in progress, enlarged display mode is terminated, and processing for returning to normal live view display is carried out. Specifically, an instruction for whole image output is issued to the pre-processing circuit 225 (#63), and an instruction to stop enlarged display is issued to the image processing circuit 257 (#65). If the processing of step #61 or step #65 is completed, processing advances to step #71, where it is determined whether or not there has been any operation of the cross button 30.

If the result of determination in #71 is that the cross button 30 has been operated, it is next determined whether or not enlarged display is in progress (#73). If the result of determination in either of step #71 or step #73 is N, there is a jump to step #77, but if the result of determination in both steps is Y, namely that enlarged display is in progress and the cross button 30 has been operated, movement of an enlargement region corresponding to the cross button 30 is instructed (#75).

Figure 13E:
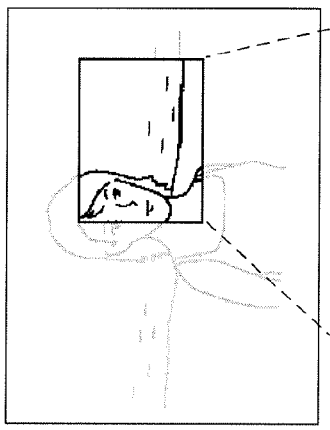
FIGS. 13A to 13E are drawings showing display states on a liquid crystal monitor when in enlarged display mode of the first embodiment of the present invention, with FIG. 13A showing an overall display state, FIG. 13B showing an enlarged display state, FIG. 13C showing a state where the enlargement range is moved, FIG. 13D showing an enlarged portion of FIG. 13B, and FIG. 13E showing an enlarged portion of FIG. 13C.
Figure 13C:
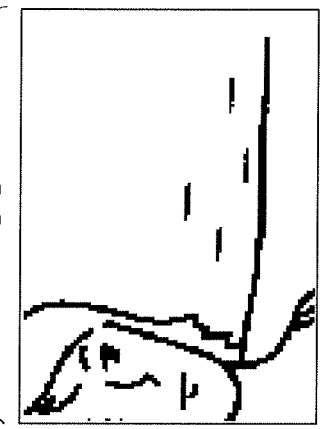
Figure 13D:
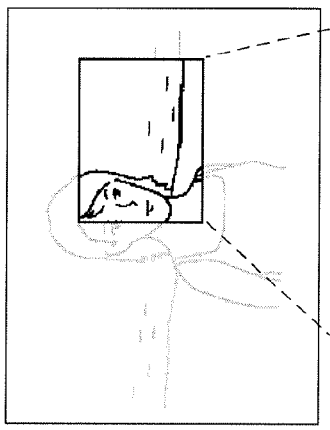
Figure 13B:
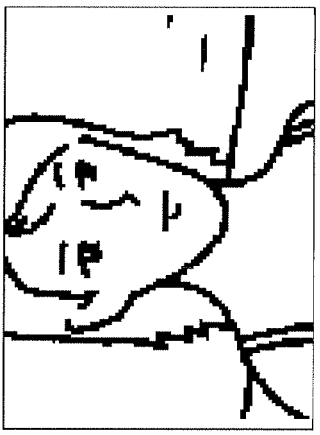
Figure 13A:
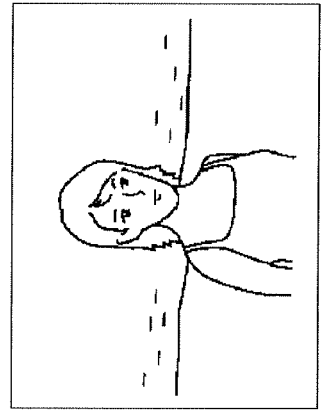

In this manner, within this embodiment if the live view display mode is entered, a subject image is displayed full screen on the liquid crystal monitor 26, as shown in FIG. 13A (#51). If the enlargement button 34 is operated in this state (#55), the subject image is displayed enlarged, as shown in FIG. 13B (#61). This enlarged display is part of the full screen display, as shown in FIG. 13D. After that, if the cross-shaped button 30 is operated (#71), enlarged display is carried out for a position corresponding to operation of the cross-shaped button 30 (#75). The enlarged display at this time corresponds to a position, at part of the full screen display, depending on operation of the cross-shaped button 30, as shown in FIG. 13E.

It is next determined whether or not the live view display switch that links to the live view display button 33 is on (#77). If the live view display button 33 is pressed once, the live view display mode is entered, and if it is pressed again the live view display mode is released. If the result of determination in step #77 is that the live view display switch is on, then the life view display mode is terminated in step #85 and after.

If the result of determination in step #77 is that the live view display switch is not on, it is determined whether or not the playback switch that links to the playback button 38 is on (#79). In order to carry out playback display of image data that is stored in the storage medium 277 on the liquid crystal monitor 26, it is necessary to terminate the live view display. If the result of determination is step #79 is that the live view display switch is on, then the live view display mode is terminated in step #85 and after.

If the result of determination in step #79 is that the playback switch is not on, it is determined whether or not the menu switch that links to the menu button 37 is on (#81). In order to carry out menu display on the liquid crystal monitor 26, it is necessary to terminate the live view display. If the result of determination is step #81 is that the live view display switch is on, then the live view display mode is terminated in step #85 and after.

If the result of determination in #81 is that the menu switch is not on, it is determined whether or not the power switch is on (#83). If the result of determination is that the power switch is off, then in order to carry out power off processing enlarged display mode is terminated in step #85 and after. If the result of determination in step #83 is that the power switch is on, processing returns to step #53 and the operations described above are repeated.

Figure 15A:
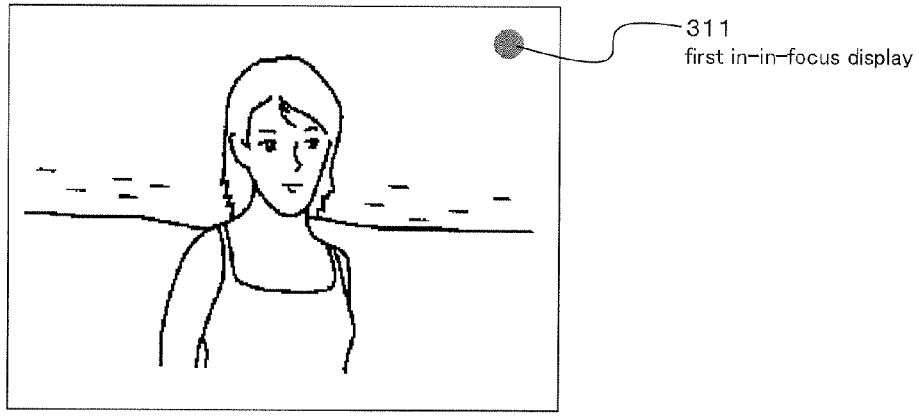
FIGS. 15A and 15B are drawings showing focus completion display of the first embodiment of the present invention, with FIG. 15A showing a first focus display, and FIG. 15B showing a second focus display.
Figure 15B:
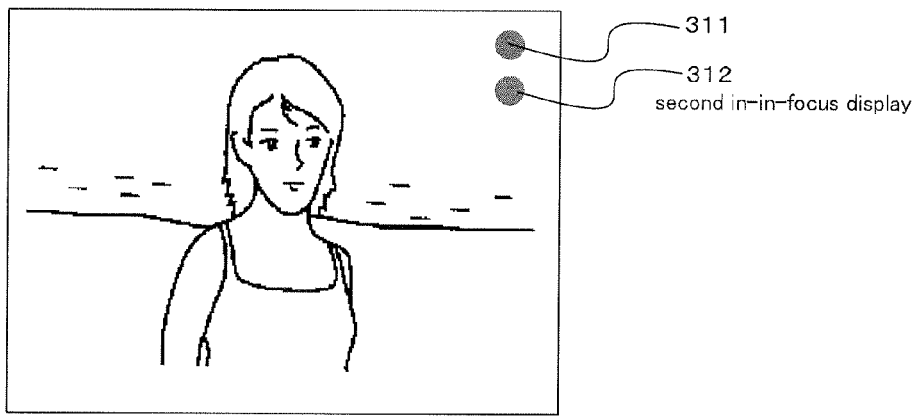

If a transition is made to step #85 in order to terminate live view display, first of all focus display is turned off (#85). As will be described later, if a subject is focused on, a first focus display 311 and a second focus display 312 as shown in FIG. 15A and FIG. 15B are displayed, and so if these focus displays are active they are turned off. Next, an instruction to stop live view display is issued to the pre-processing circuit 225 and the image processing circuit 257 etc. (#87). After that, instruction of a shutter close operation is issued to the shutter 213 (#89), the movable mirror 201 is subjected to a return operation (moved to the lowered position) (#91), and the original routine is returned to.

Figure 6:
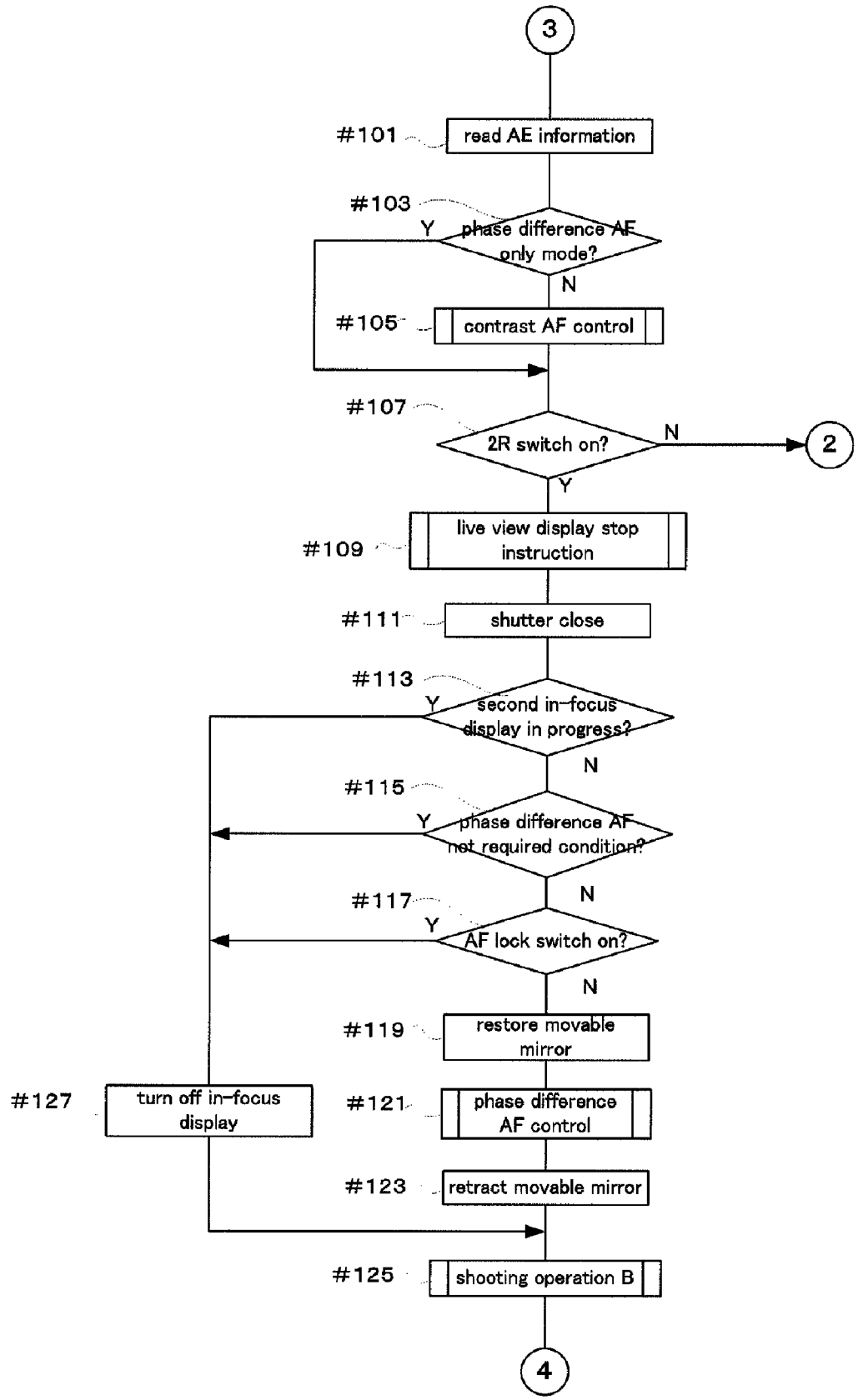
FIG. 6 is a flowchart showing a live view display operation of the first embodiment of the present invention.

If the result of determination in step #53 (FIG. 4) is that the 1R switch is on, reading of AE information is carried out (#101, FIG. 6). Photometry in step #43 is with the movable mirror 201 in the lowered position, which means that it is possible to perform photometry using the photosensor 211, but in this step the movable mirror 201 is retracted (in the raised up position) and it is not possible to perform photometry using the photosensor 211. AE information is therefore obtained based on output of the AE circuit 255.

Figure 14:
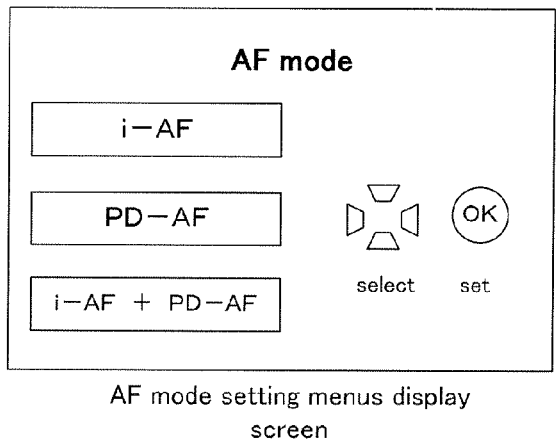
FIG. 14 is a drawing showing an AF mode setting menu display screen of a first embodiment of the present invention.

It is next determined whether or not phase difference AF only mode is being carried out (#103). In the selection screen for AF mode during a menu setting operation of step #35 (refer to FIG. 14), it is possible to carry out AF mode selection. Specifically, within this embodiment, it is possible to select either of i-AF mode for carrying out contrast AF only based on output of the image sensor 221, PD–AF mode for carrying out only phase difference AF based on output of the phase difference AF sensor 243, and i-AF+PD–AF mode for carrying out both contrast AF and phase difference AF.

If the result of determination in step #103 is phase difference AF only mode, processing jumps to step #107, while if it is not phase difference AF only mode contrast AF control is carried out (#105). In this contrast AF control, control is performed so that the photographing optical system 101 reaches an in focus state based on contrast information from the contrast AF circuit 253. This phase contrast AF control will be described in detail later using FIG. 10 and FIG. 11.

Next it is determined if the release button 21 has been pressed down fully (shooting operation), that is, if the 2R switch is on (#107). If the result of determination is that the 2R switch is not on, processing returns to step #53 and operations such as the contrast AF control described above are repeated. On the other hand, if the 2R switch is on, a shooting operation is executed in steps #109 and after.

If the shooting operation is entered, first, live view display is stopped (#109). Next, the shutter 213 is closed (#111). During live view display, the shutter 213 is opened, and a subject image is displayed on the liquid crystal monitor 26 based on output of the image sensor 211, but the shutter 213 is temporarily closed in order to enter the shooting operation.

It is next determined whether or the second focus display is being carried out (#113). In the subroutine for contrast AF control, it is possible to execute first contrast AF control for guiding the photographing lens to within a first in-focus permissible range, and second contrast AF control for guiding the lens to within a second in-focus permissible range that is narrower that the first in-focus permissible range, and if the second contrast AF control is completed, the second focus display is carried out (#277 in FIG. 11 and FIG. 15B). In step #113 it is determined whether or not this high precision second focus state has been achieved.

In step #113, if the second focus display is not in progress it is determined whether or not there is a phase difference AF not required condition (#115). As a phase difference AF not required condition, there are cases of (1) focal distance of the photographing lens is at a wider angle side than a specified value, (2) aperture value is a specified value or greater (aperture opening diameter is small), and (3) subject depth of field is deeper than a first in-focus permissible range due to the fact that the subject distance is more to a longer distance side than a specified distance. Specifically, in the event that these conditions are satisfied, it can be considered that sufficient focus precision will be obtained even with first contrast AF control only, and so it is not necessary to further carry out high precision phase difference AF.

If a phase difference AF not required condition is not satisfied in step #115 it is determined whether or not the AF lock switch that links to the AF lock button 28 is on (#117). If the result of determination is that the AF lock switch is not on, phase difference AF is carried out in step #119 and after. Specifically, if the results of determination in all of steps

113, #115 and #117 pass through N, high precision AF is carried out using phase difference AF.

In order to carry out phase difference AF, first of all the movable mirror 201 is restored, and inserted into the optical path of the photographing optical system 101 (#119). In this way, subject light flux for phase difference AF is guided is guided to the phase difference AF sensor 243. Next, phase difference AF control is carried out (#121). In this step, focal point defocus direction and focal point defocus amount of the photographing system 101 are detected using well-known phase difference AF, drive control for the optical system drive mechanism 107 is carried out based on this defocus direction and defocus amount, and focusing of the photographing optical system 101 is carried out. Details will be described later using FIG. 9.

If the phase difference AF control is finished, the movable mirror 201 is moved to the raised up position, that is, retracted (#123). As a result, subject light flux that has passed through the photographing optical system 101 is again guided to the image sensor 221, and an image is formed on the image sensor 221.

If the result of decision of any of the above described steps #113 or #115 passes through Y, then there is no longer any need to perform high precision AF using phase difference AF, and if the result of determination in step #117 is that the AF lock switch is on then the photographer has already determined the focus position, and so the shooting operation is entered directly so that there will be no unintentional changing of the focus position due to phase difference AF, but before that the focus display is turned off (#127).

If steps #123 and #127 are completed, then a shooting operation B is next carried out to acquire and store image data based on the subject image (#125). This shooting operation B will be described later using FIG. 8. If the shooting operation B is completed, processing returns to step #43, live view display is resumed, and the operations described above are repeated.

Figure 7:
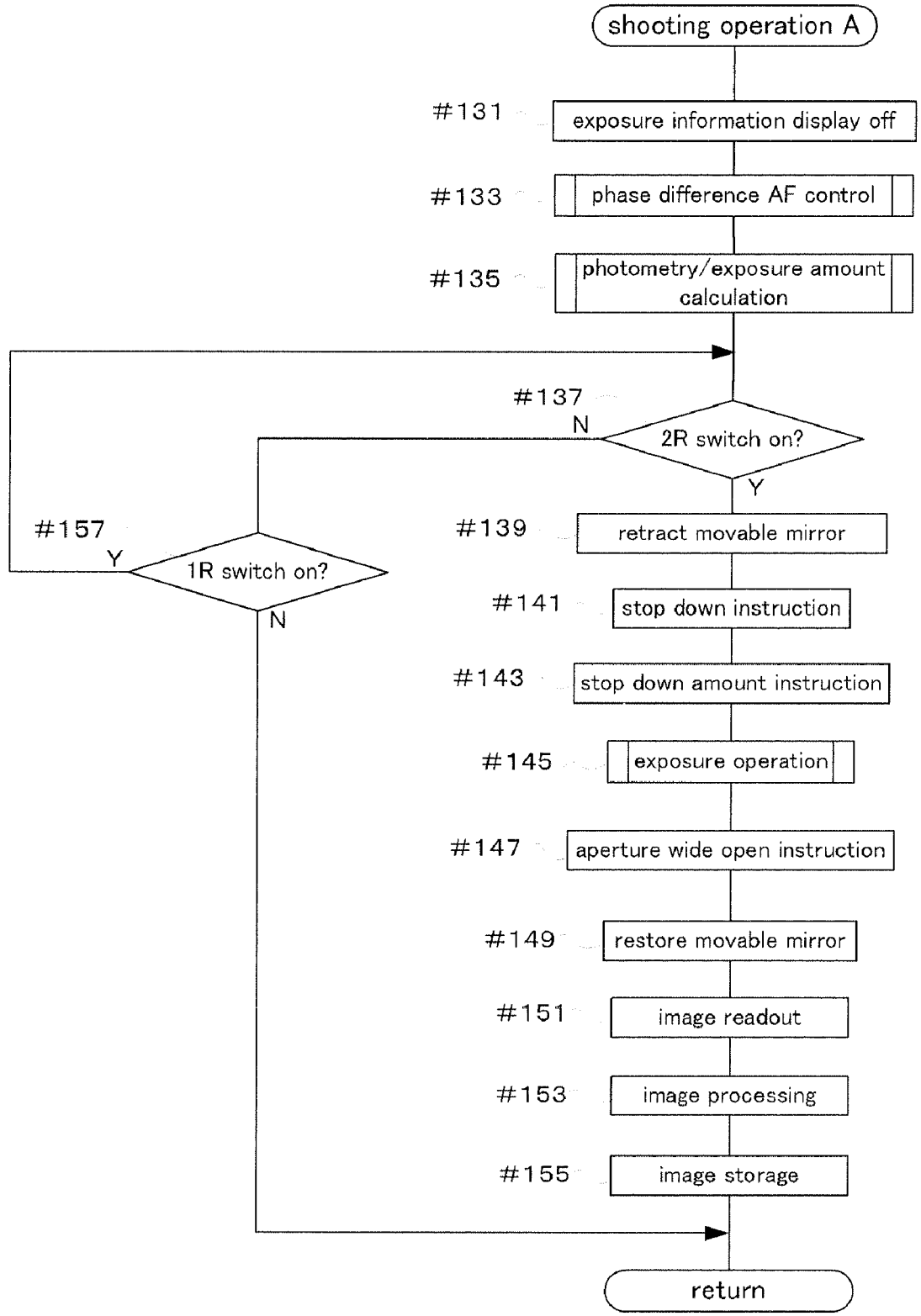
FIG. 7 is a flowchart showing operation of a shooting operation A of the first embodiment of the present invention.

Next, a sub-routine for the shooting operation A of step #37 will be described using FIG. 7. This shooting operation A is a subroutine executed when the release button 21 has been pressed down halfway in the normal optical viewfinder viewing state (that is, non-live view display). If the shooting operation A subroutine is entered, first of all exposure information display is turned off (#131).

Next, similarly to step #121, the phase difference AF control subroutine is executed (#133). Specifically, defocus direction and defocus amount are obtained based on output of the phase difference AF sensor 243, and focusing of the photographing optical system 101 is carried out. This subroutine will be described in detail later using FIG. 9.

If phase difference AF is completed, then similarly to step #11 photometry and exposure value calculation are carried out, and exposure control values such as shutter speed and aperture value are obtained (#135). Next it is determined whether or not the shutter button 21 has been pressed down fully, that is, if the 2R switch is on (#137). If the result of determination is that the 2R switch is not on, it is then determined whether or not the 1R switch is on (#157). If the result of determination is that the 1R switch is not on, the shooting operation A is terminated and the original routine is returned to. On the other hand, if the result of determination is that the 1R switch is on, step #137 is returned to, and a standby state is entered where the states of the 1R switch and the 2R switch are mutually detected.

If the result of determination in step #137 is that the 2R switch is on, processing transfers to a step for performing exposure. First a retraction operation for the movable mirror 201 (moving to the raised position) is carried out (#139). As a result, subject light flux is guided to the image sensor 221 by the photographing optical system 101. Next, a stopping down operation is instructed to the lens CPU 111 (#141) and a stopping down amount is also instructed (#143).

As a result, it is possible to prepare entry to the shooting operation, and so a shooting operation is started (#145). Shooting is the starting of travel of the front curtain of the shutter 213, together with charge accumulation of the image sensor 221. If a time corresponding to the shutter speed acquired in step #135 or a shutter speed that was manually set by the photographer has elapsed, travel of the rear curtain of the shutter 213 starts, and charge accumulation of the image sensor 221 is terminated.

If the shooting operation is completed, an instruction to fully open the aperture is output to the lens CPU 111 (#147). Next, a restore operation of the movable mirror 201 to the lowered position is carried out (#149), and image signals are read out from the image sensor 221 (#151). Image processing of the read out image signals is carried out by the image processing circuit 257 etc. (#153), and the processed image data is stored in the storage medium 227 (#155). Once image storing is finished, the original routine is returned to.

Figure 8:
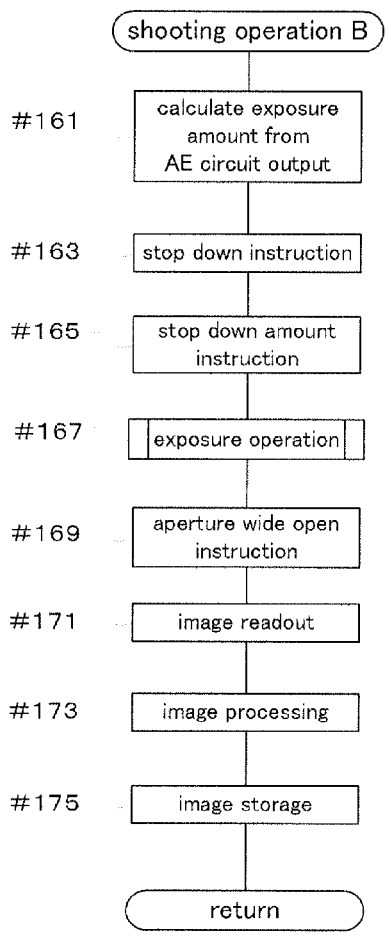
FIG. 8 is a flowchart showing operation of a shooting operation B of the first embodiment of the present invention.

Next, a sub-routine for the shooting operation B of step #125 (FIG. 6) will be described using FIG. 8. This shooting operation B is a subroutine executed in the event that the release button 21 is pressed down fully in the live view display state. If the subroutine for shooting operation B is entered, exposure values are calculated based on output of the AE circuit 255 (#161).

Next, similarly to steps #141 and #143, a stopping down instruction and a stopping down amount instruction are issued (#163 and #165). Then, similarly to step #145, a shooting operation is carried out (#167), and as a result image data of the subject image is acquired based on output of the image sensor 221. After that, similarly to steps #147, #151, #153 and #155, full opening of the aperture is instructed (#169), image signals are read out (#171), and image processing is carried out (#173) and processed signals stored in the storage medium 277 (#175). Once image storing is finished, the original routine is returned to.

Next, a sub-routine for phase difference AF control of step #121 (FIG. 6) and step #133 (FIG. 7) will be described using FIG. 9. This phase difference AF control is for obtaining defocus direction and defocus amount of the photographing optical system 101 with a well known phase difference method, using two peripheral light fluxes of the photographing optical system 101. It is possible to carry out AF with the same high degree of precision as high precision AF in contrast AF.

If the phase difference AF control subroutine is entered, first all point focus detection is carried out (#181). Specifically, defocus direction and defocus amount are detected for all points where detection is possible using the phase difference AF sensor 243 and the phase difference AF processing circuit 245. Next, a point that is at the closest distance is selected from among all the detected points (#183). Generally, the main subject is most often that which is the closest subject, and selection is carried out to this end.

Next, it is determined whether or not a focus range has been entered into based on defocus amount of the elected closest point (#185). A determination reference for whether or not the focus range is entered is determination as to whether or not the defocus amount has come within a focus tolerance value based on a permissible circle of confusion. If the result of determination is that it is within a focus range, the original routine is returned to. This permissible circle of confusion is set in accordance with the imaging resolution of the image sensor 221, in other words, the sensor size of the image sensor 221.

On the other hand, if the result of determination is that it is not within a focusing range, drive direction and drive amount for driving the photographing optical system 101 using the optical system drive mechanism 107 are calculated based on defocus direction and defocus amount for the selected focus detection point. Lens drive control for the optical system drive mechanism 107 is then instructed to the lens CPU 111 (#189), and the lens drive amount and drive direction at that time are instructed (#191).

If a lens drive control instruction is output to the lens CPU 111, the body CPU 251 awaits input of a signal indicating lens drive completion from the lens CPU 111 (#193). If lens drive is completed, focus detection is carried out for the focus detection point selected in step #183 (#195). If focus detection is completed, processing returns to step #185 and the steps described above are repeated until a focus range is entered.

Figure 10:
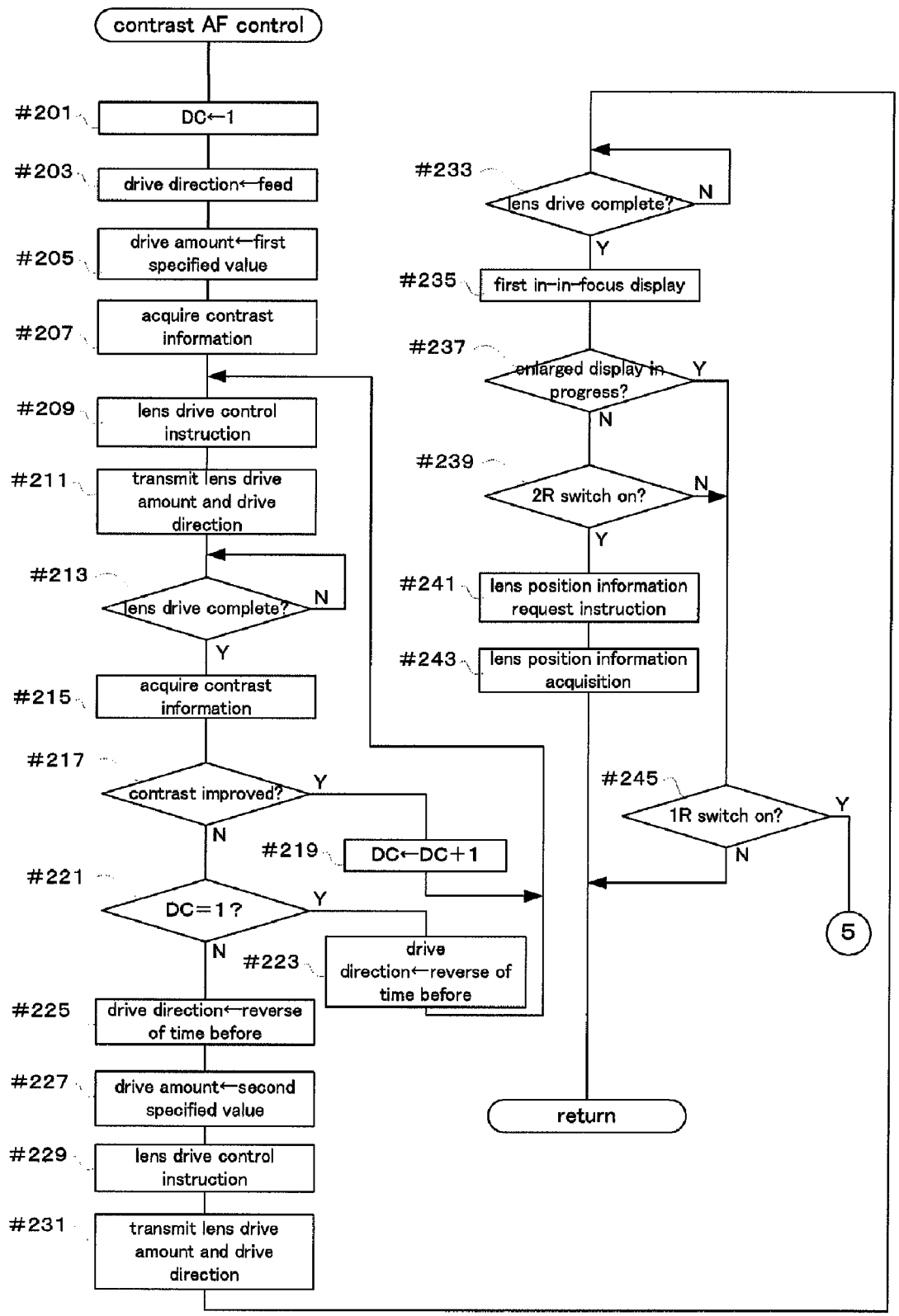
FIG. 10 is a flowchart showing contrast AF control of the first embodiment of the present invention.

Next, a sub-routine for contrast AF control of step #105 (FIG. 6) will be described using FIG. 10 and FIG. 11. This contrast AF control is performing drive of the photographing optical system 101 so that contrast information of the contrast AF circuit 253 becomes maximum based on output of the image sensor 221. This contrast AF control can be used when the movable mirror 201 is at the retracted position (raised up position) and it is not possible to perform phase difference AF control based on output of the phase difference AF sensor 243.

Also, in the contrast AF control, there are two modes, namely high speed contrast AF (first contrast AF) that carries out AF control at high speed but with first focus precision of rough focus precision, and high precision AF (second contrast AF) that carries out AF control at low speed but with a second focus precision that is high focus precision.

If the contrast AF control subroutine is entered, first contrast AF commences, and first of all a register DC is set to 1 (#201). This register DC is a register that is used in order to determine drive direction for the lens drive. Next, the lens feed direction is set as the drive direction (#203). A first specified value is then set as a lens drive amount (#205). This first specified value is equivalent to focus lens feed amount LD1 inside the photographing optical system 101, in FIG. 16A, and is an amount relating to a defocus amount $\Delta f$ LCD corresponding to the diameter $\phi$LCD of a permissible circle of confusion for the liquid crystal monitor in FIG. 18

Next, contrast information is acquired from the contrast AF circuit 153 (#207). Lens drive control is then instructed to the lens CPU 111 (#209), and the lens drive amount and drive direction that were set in steps #203 and #205 are transmitted (#211). If these signals are transmitted, the lens CPU 111 drives the photographing optical system 101 using the optical system drive mechanism 107. If drive control based on the set drive direction and drive amount is completed, the lens CPU 111 transmits a lens drive completion signal to the body CPU 251.

The body CPU 251 awaits receipt of the lens drive completion signal (#213), and upon receipt acquires newest contrast information from the contrast AF circuit 253 (#215). Next, it is determined whether or not contrast has improved compared to the previous time (#217). If the result of determination is that the contrast this time has improved, 1 is added to the register DC (#219), processing returns to step #209, and the previously described steps are repeated.

If the result of determination in #217 is that the contrast is lower than the time before, it is determined whether or not the value of the register DC is 1 (#221). If the result of determination is that the register DC is 1, the lens drive direction is reversed from that the time before (#223), processing returns to step #209, and the previously described steps are repeated.

Specifically, at the time of initial lens drive, the direction in which it should be driven is unclear, and the lens is temporarily driven in the feed direction. If the result of driving is that contrast is improved, the drive direction is correct (approaching the focus position) while if contrast is lowered the drive direction is backwards (moving away from the focus position) and so the drive direction is reversed. Accordingly, if the register DC is 1 it is determined to be the initial drive direction and processing advances to step #223 where the drive direction is reversed, while if the register DC is not 1 it is determined that contrast has reached a peak position and processing advances to step #225.

If the result of determination in step #221 is that register DC is not 1, the lens has been driven in a direction that improves contrast, but since it is lowered here it is determined that the peak contrast position has been passed, and the drive direction is made opposite to that the time before (#225). A second specified value is then set as a lens drive amount (#227).

The second specified value for the lens drive amount is equivalent to half the feed amount LD1 of the focus lens. Since the peak contrast position has been passed, it is assumed that the peak position is somewhere between this time and the previous time, and the first specified value is halved. Lens drive control is then instructed to the lens CPU 111 (#229), and the lens drive amount and drive direction that were set in steps #225 and #227 are transmitted (#231).

Upon receipt of the lens drive control instruction etc, the lens CPU 111 commences drive control for the optical system drive mechanism 107, and once drive is performed by a drive amount based on the second specified value a lens drive completion signal is transmitted to the body CPU 251. The body CPU 251 awaits receipt of the lens drive completion signal (#233), and if this completion signal is received first focus display is carried out (#235). This is display of a first focus display 311 on the display screen of the liquid crystal monitor 26, as shown in FIG. 15A.

The state where this first focus display is issued is a focus state where focus blur is at a low level that is unnoticeable, if a subject image is confirmed on the liquid crystal monitor 26, even if it is insufficient for photographing, and this in-focus permissible range is set using diameter of a permissible circle of confusion based on display resolution of the liquid crystal monitor 26, that is, the display dot size of the liquid crystal monitor 26. Therefore, sufficient focus precision is achieved to monitor the subject image on the liquid crystal monitor 26.

Next, it is determined whether or not enlarged display is in progress (#237). In step #55, it is determined whether or not enlarged display has been set. If the result of determination is that enlarged display is not in progress, it is then determined whether or not the 2R switch is on (#239). If the result of determination is that the 2R switch is on, a lens position information request is issued to the lens CPU 111 (#241). The lens CPU 111 acquires lens position information from the optical system position detection mechanism 105, and transmits this information to the body CPU 251. The body CPU 251 acquires the transmitted lens position information (#243).

If the first focus display is carried out in step #235, a rough focus state using contrast AF control is entered. In this state, if enlarged display is in progress or the release button 21 has not been pressed fully down control is carried out so as to achieve a higher precision focused state using contrast AF control. However, if the release button 21 is fully pressed and the shooting operation is entered, step #107 of FIG. 6 is returned to, and if specified conditions are satisfied, after carrying out phase difference AF in step #121 the shooting operation B of step #125 is carried out. The acquisition of lens position information in steps #241 and #243 is in order to determine whether or not a phase difference AF not required condition in step #115 is met.

If it is determined in step #237 that enlarged display is in progress, or it has been determined in step #239 that the 2R switch is not on, it is then determined whether or not the 1R switch is on (#245). If the result of determination is that the 1R switch is not on the original routine is returned to, but if the 1R switch is on contrast information acquisition is carried out for second contrast AF (#251, FIG. 11).

Figure 16A:
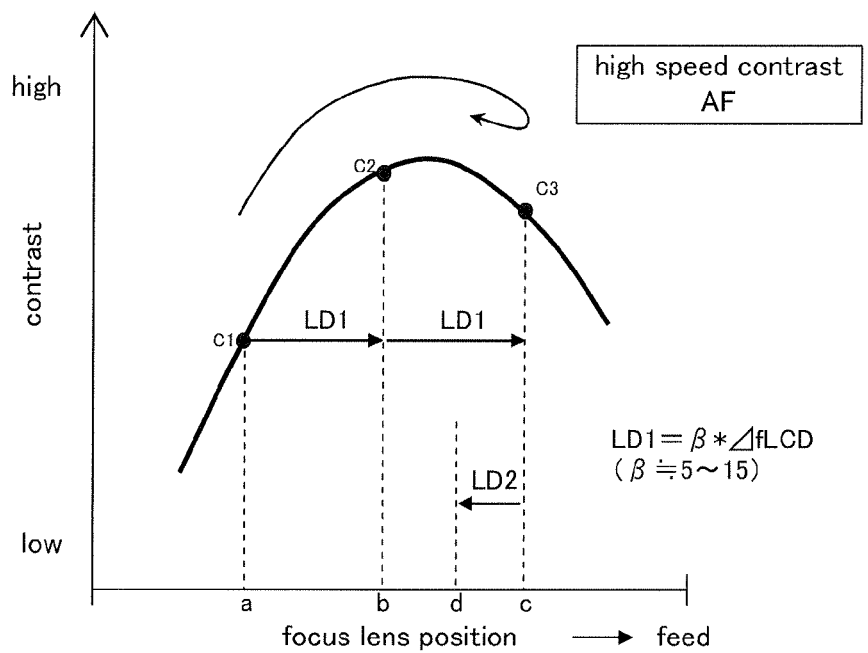
FIGS. 16A and 16B are drawings showing a relationship between contrast information and of driving of the focus lens in the first embodiment of the present invention, with FIG. 16A showing the case of high speed contrast AF, and FIG. 16B showing a case of high precision contrast AF.
Figure 16B:
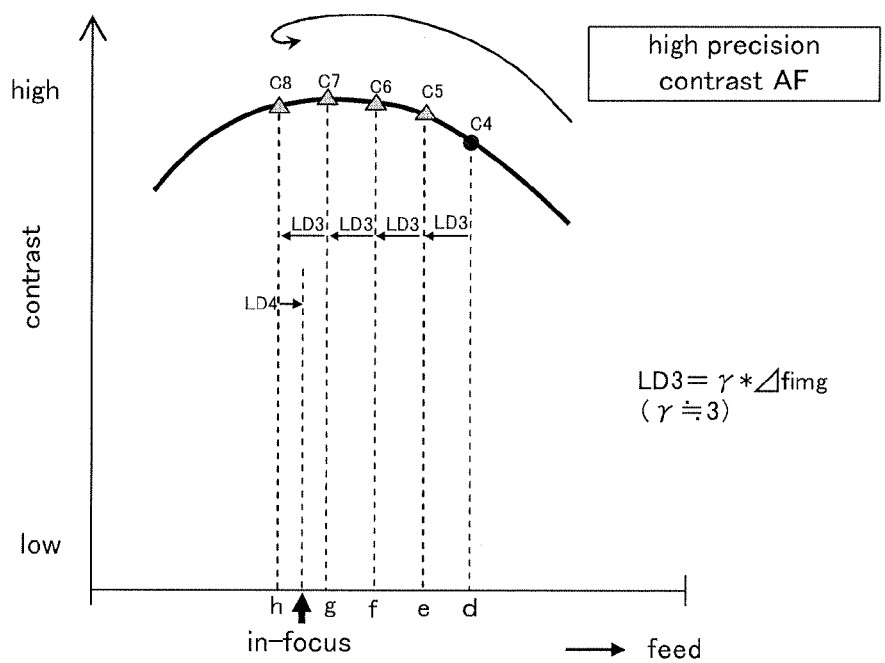
Figure 18:
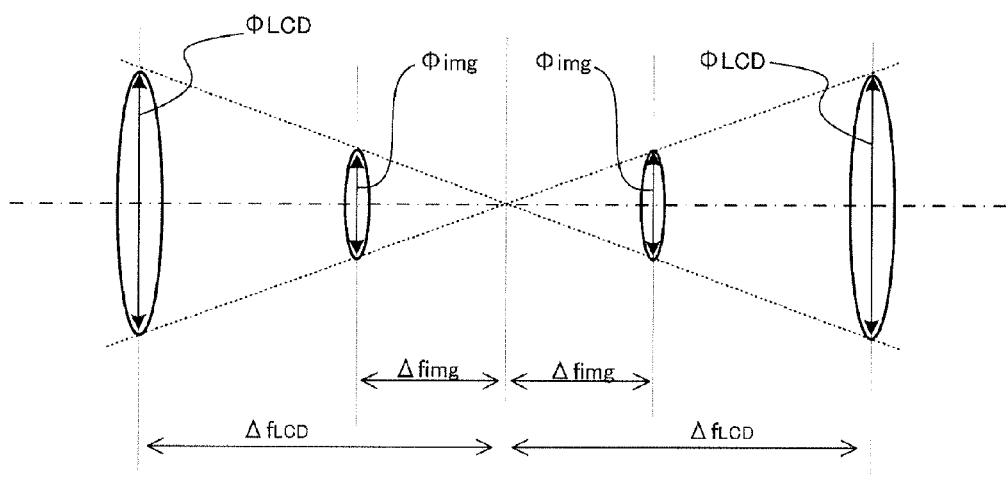
FIG. 18 is a drawing showing a relationship between diameter of permissible circle of confusion and defocus amount if the first embodiment of the present invention.

Next, the lens drive direction is set to the same as that the time before (#253), and a third specified value is set as the drive value (#255) This third specified value is equivalent to focus lens feed amount LD3 in FIG. 16B, and is an amount relating to a defocus amount Δf img corresponding to the diameter φimg of a permissible circle of confusion for imaging surface of the image sensor 211 in FIG. 18

Lens drive control is then instructed to the lens CPU 111 (#257), and the lens drive amount and drive direction that were set in steps #253 and #255 are transmitted (#259). The lens CPU 111 carries out drive control for the photographing optical system 101 by controlling the optical system drive mechanism 107. If drive control is completed, the lens drive completion signal is transmitted to the body CPU 251, and the body CPU 251 is put into a standby state until this lens drive completion signal is received (#261).

If the body CPU 251 receives the lens drive completion signal, contrast information is next acquired (#263). It is then determined whether or not this contrast information is improved compared to the time before (#265). If the result of determination is that the contrast is improved, it is determined whether or not enlarged display is in progress (#283), and it is determined whether or not the 2R switch is on (#285). If the result of determination is that enlarged display is in progress, or that the 2R switch is not on even if enlarged display is not in progress, it is then determined whether or not the 1R switch is on (#287).

If the results of determination in steps #283, #285 and #287 are that enlarged display is in progress, or that the 2R switch is off even if enlarged display is not in progress, and that the 1R switch is on, processing returns to step #257, and the above described steps are repeated as long as contrast is improved. On the other hand, if the enlarged display is not in progress and the 2R switch is on, processing jumps to step #279, and after the processing of steps #279 and #281 the original routine is returned to. Within this embodiment, after carrying out the first focus display, when second contrast AF is being carried out, if enlarged display is not in progress the second contrast AF is interrupted if the 2R switch is turned on, but if enlarged display is in progress the state of the 2R switch is not detected and so the second contrast AF is not interrupted even if the 2R switch is on.

If the result of determination in step #265 is that contrast is lowered, the drive direction is set to the opposite of that the time before (#267), and a fourth specified value is set as the drive value (#269). The fourth specified value for the lens drive amount is equivalent to half the feed amount LD3 of the focus lens in FIG. 16B. Since the peak contrast position has been passed, it is assumed that the peak position is somewhere between this time and the previous time, and the third specified value is halved.

Lens drive control is then instructed to the lens CPU 111 (#271), and the lens drive amount and drive direction that were set in steps #267 and #269 are transmitted (#273). If the lens CPU 111 receives the lens drive control instruction, drive control is carried out using the optical system drive mechanism 107, and once drive control is complete a drive completion signal is transmitted to the body CPU 251. The body CPU 251 enters a standby state awaiting receipt of this lens drive completion signal (#275), and once this drive completion signal is received second focus display is carried out (#277).

This display is presenting of a first focus display 311 on the liquid crystal monitor 26, together with a second focus display 312, as shown in FIG. 15B. A state where the second focus display 312 is displayed is a high precision focus state of the same degree as the diameter of a permissible circle of confusion for the pixels of the image sensor 221, and has the same degree of focusing precision as the phase difference AF. If the second focus display 312 is carried out, next, similarly to step #241, a lens position information request is issued (#279), and similar to step #243 acquisition of lens information is carried out (#281) and the original routine is returned to.

Within this embodiment, in the event that a peak position of contrast is passed, the drive amount is halved and drive performed in the opposite direction (#225, #227, #267, #269), but this is not limiting and it is also possible, for example, to cause drive to a peak contrast position by interpolation calculation such as three-point interpolation method.

Figure 17A:
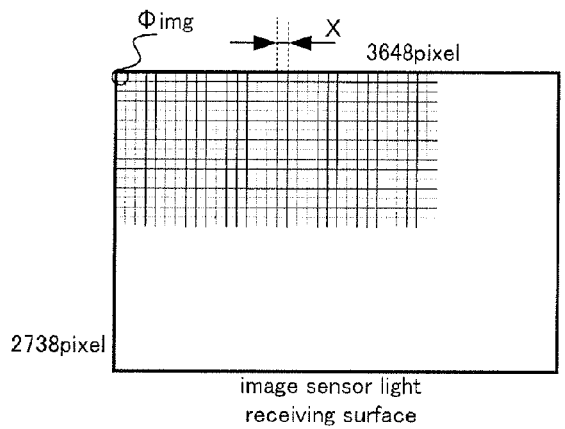
FIGS. 17A and 17B are drawings for describing the diameter of a permissible circle of confusion of an image sensor and a liquid crystal monitor of the first embodiment of the present invention, with FIG. 17A showing the diameter of permissible circle of confusion for an image sensor, and FIG. 17B showing the diameter of permissible circle of confusion for the liquid crystal monitor.
Figure 17B:
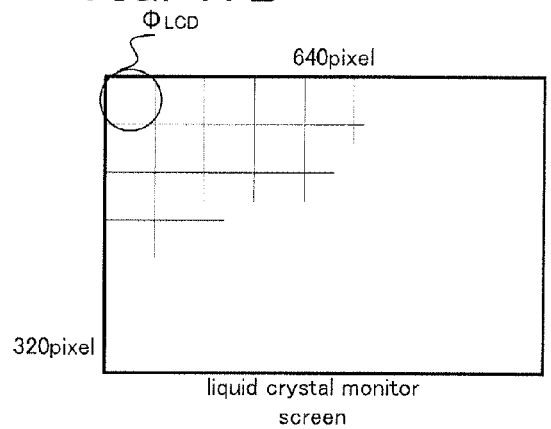

Next, focus precision for contrast AF of this embodiment will be described using FIG. 16 to FIG. 18. As shown in FIG. 17A the imaging surface of the image sensor 221 is made up of 3648 pixels in the horizontal direction by 2738 pixels in the vertical direction. On the other hand, if the liquid crystal monitor screen of the liquid crystal monitor 26 is formed from 640 horizontal pixels by 320 vertical pixels, as shown in FIG. 17B, then compared to the image sensor 221 the diameter of the permissible circle of confusion is about ⅕, and if a LPF coefficient is also considered is about ¼, which means that the diameter φLCD of the permissible circle of confusion of the liquid crystal monitor 26 becomes:

$$\phi LCD = (3648/640) * \phi img/\alpha$$
$$\approx 4 * \phi img$$

A permissible defocus amount ΔfLCD for the liquid crystal monitor equivalent to permissible circle of confusion diameter φLCD of the liquid crystal monitor 26 is thus:

$$\Delta fLCD = \phi LCD/F$$
and here, F is lens aperture value (f number)
F = D/f (D : opening diameter, f : focal distance)

Accordingly, focusing precision for the first focusing display (#235), has a drive amount set to a first specified value, and if, as shown in FIG. 16A, β*ΔfLCD is adopted as the first specified value it is possible to obtain a degree of focusing precision about that of the permissible circle of confusion diameter φLCD of the liquid crystal monitor 26. Here, β≈5–15, (β is an empirical value).

On the other hand, as shown in FIG. 17A, the imaging surface (light receiving surface) of the image sensor 221 is made up of 3648 horizontal pixels by 2838 vertical pixels. The permissible circle of confusion diameter φimg of this image sensor 221 is $$\phi img = \alpha * X$$
and here α is LPF coefficient (=1.5 – 2)
X is sensor size The LPF coefficient is a coefficient due to the effect of the infrared cut/low pass filter 217, and so the permissible circle of confusion diameter φimg of the image sensor is obtained by multiplying the pixel size of the image sensor by a coefficient that takes into consideration the low pass filter.

The permissible defocus amount Δf img for imaging equivalent to the permissible circle of confusion diameter φimg of the image sensor 221 is therefore:

$$\Delta fimg = \phi img/F$$
and here, F is lens aperture value (f number)
F=D/f (D is opening diameter, f is focal distance)

Accordingly, focusing precision for the second focusing display (#277), has a drive amount set to a second specified value, as this second specified value, and if, as shown in FIG. 16B, γ*Δf img is adopted as the second specified value it is possible to obtain a degree of focusing precision about that of the permissible circle of confusion diameter φimg of the image sensor 221. Here, γ≈3, (γ is an empirical value). The number of pixels etc. described here is an example, and it is possible to determine the permissible circle of confusion diameter, defocus amount and drive amount according to design values of each imaging device. The in-focus permissible range for phase difference AF is also determined based on Δf img.

Figure 12:
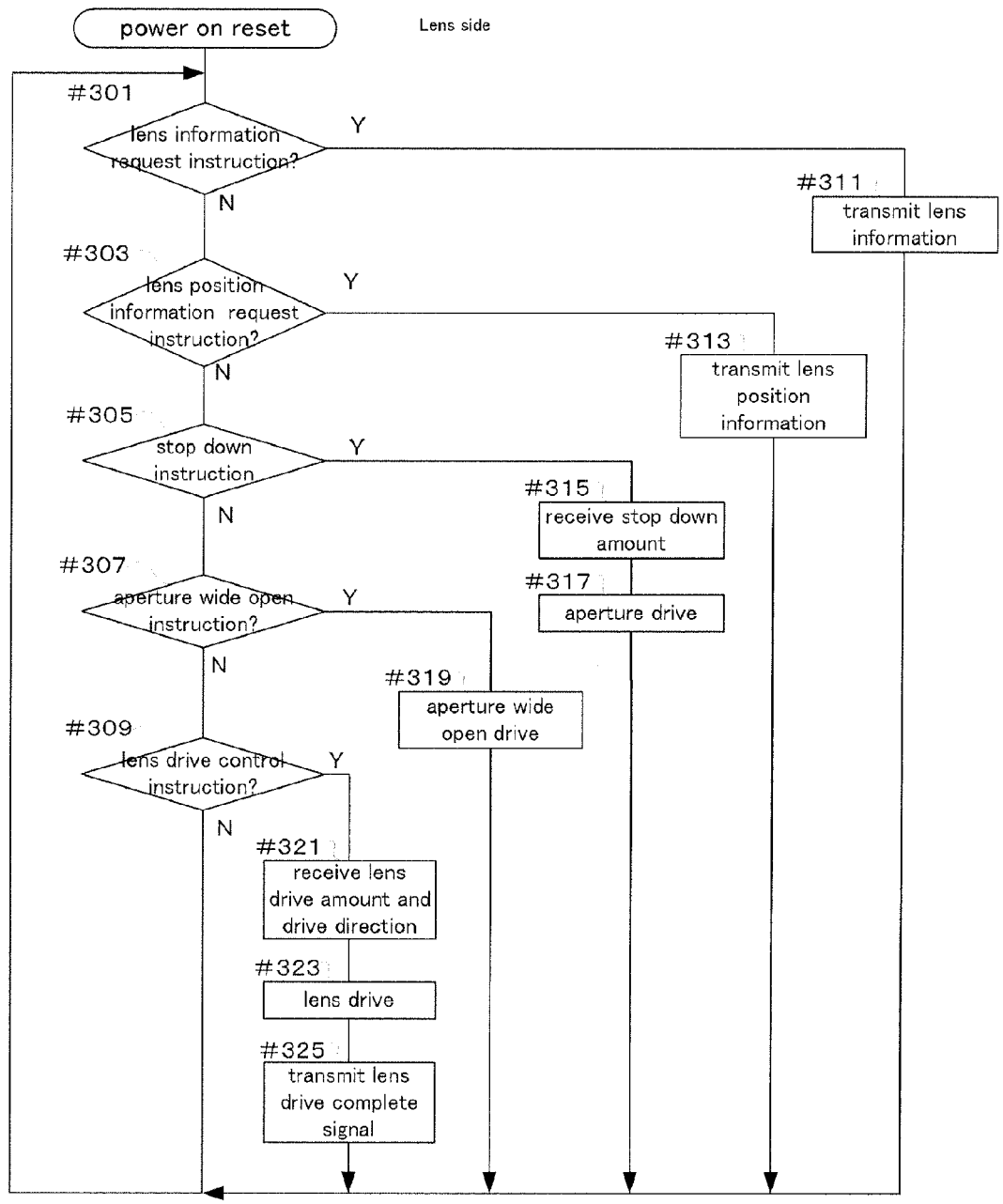
FIG. 12 is a flowchart showing a power-on reset operation, in an interchangeable lens, of the first embodiment of the present invention.

Next, operations by the lens CPU 111 of an interchangeable lens 100 will be described using FIG. 12. First, it is determined whether or not a lens information request instruction has been issued from the body CPU 251 (#301). If the result of determination is that there is a request instruction, the lens information is transmitted (#311). As the lens information here, there is maximum aperture value, minimum aperture value, lens color balance information, aberration information, information for AF, lens specific information etc., and information stored inside the lens CPU 111 or in a not shown electrically rewritable memory such as EEPROM If the result of determination in #301 is that there is no lens information request instruction, it is determined whether or not there is a lens position information request (#303). If the result of determination is that there is a position information request, the lens position information is transmitted to the body CPU 251 (#313). The lens position information is detected by the optical system position detection mechanism 105, and so this information is transmitted.

If the result of determination in #303 is that there is no position information request instruction, it is determined whether or not there is a stop down instruction (#305). If the result of determination is that there is a stop down instruction, the aperture value transmitted from the body CPU 251 is received (#315). Once the aperture value is received, control of stop down drive of the aperture 103, carried out by the aperture drive mechanism 109, is carried out (#317).

If the result of determination in #305 is that there is no stop down instruction, it is determined whether or not there is a an aperture wide open instruction (#307). If the result of determination is that there is an aperture wide open command, control of wide open drive of the aperture 103, carried out by the aperture drive mechanism 109, is carried out (#319).

If the result of determination in #307 is that there is no wide open instruction, it is determined whether or not there is lens drive control instruction (#309). If the result of determination is that there is a lens drive control instruction, a transmitted lens drive amount and drive direction are received (#321). Once the lens drive amount and drive direction are received, the lens CPU 111 controls the optical system drive mechanism 107 to carry out drive control of the photographing optical system 101 (#323). Then, if a specified drive amount is driven, a lens drive completion signal is transmitted to the body CPU 251 (#325).

In this way, within this embodiment, after carrying out the contrast AF in step #105, phase difference AF is carried out in step #121. With contrast AF at least focus adjustment that is high speed and of rough focus precision is carried out, and as well as this, in step #121 high precision phase difference AF is carried out. The focus precision of contrast AF is rough precision (first focusing precision), but is a tentatively focused state, and so not a lot of time is taken from this focused state to completion of high precision focus adjustment, and as a result it is possible to perform focus adjustment with only a small time lag and with high precision.

Also, if the determination of step #113 in this embodiment is that there is the second focus display, that is, focus has been achieved with high precision contrast AF, the phase difference AF of step #121 is omitted. Specifically, within this embodiment, there are provided a first focus adjustment mode for carrying out a combination of high speed contrast AF and phase difference AF, and a second focus adjustment mode for carrying out focus adjustment using high precision contrast AF after high speed contrast AF. Therefore, with the second focus adjustment mode, it is possible to omit phase difference AF, and it is possible to reduce time lag by the time required for phase difference AF. Also, with high precision contrast AF, it is possible to achieve high precision focus adjustment with the same degree of precision as phase difference AF, and it is possible to ensure sufficient focusing precision.

Further, in step #115 in this embodiment phase difference AF not required conditions are determined, and if this not required condition is satisfied the phase difference AF of step #121 is omitted. It is therefore possible to reduce the time lag by the time required for the phase difference AF, and it is possible to carry out high precision focus adjustment. Within this embodiment there are three conditions that are determined to be phase difference AF not required conditions, but this is not limiting, and it is possible to add other conditions, and it is also possible to omit any of the conditions. In any event, even if high precision phase difference AF is not performed, as long as sufficient focus precision is obtained the phase difference AF can be omitted.

Further, in step #117 in this embodiment it is determined whether or not AF lock is active, and if AF lock is active the phase difference AF of step #121 is omitted. It is therefore possible to reduce time lag by the time required for the phase difference AF. In particular, if AF lock has been activated, the photographer has designated the focus position and it is often the case that a picture will be taken quickly, and at least the first focus display is performed making it possible to confirm focus precision at a glance. Within this embodiment, phase difference AF has been omitted in the event that the AF lock button 28 has been operated, but it is not limited to the AF lock button 28 and it is also possible to omit phase difference AF if another operation member is operated.

Further, within this embodiment, if enlarged display has been carried out, phase difference AF is omitted. During enlarged display, until the second focus display, determination of the state of the 2R switch in steps #237, #239, and steps #283, #285 is prohibited. Therefore, if enlarged display is being carried out, if the release button 21 is pressed down fully and the shooting operation carried out, high precision phase difference AF becomes unnecessary. For this reason, it is possible to omit the phase difference AF of step #121 making it possible to shorten time lag by the time required for phase difference AF, and it is possible to ensure sufficient focus precision.

As has been described above, within this embodiment there are provided an image sensor 221 that receives subject light flux that is made incident via a photographing optical system 101 on its imaging surface, photoelectrically converts a subject image formed on the imaging surface and outputs subject image data, a liquid crystal monitor 26 for carrying out live view display using the subject image data acquired by the image sensor 221, contrast AF unit (contrast AF circuit 253 etc. and #105 contrast AF control) for executing a live view display operation and obtaining contrast information of the subject image from subject image data, to guide the photographing optical system 101 to within a specified in-focus permissible range based on this contrast information, and phase difference AF unit (phase difference AF sensor 243 etc. and phase difference AF control of #121) for causing a movable mirror 201 to be placed in an optical path of the photographing optical system 201, receiving subject light flux reflected by the movable mirror 201 to detect a defocus amount of the photographing optical system, and guiding the photographing optical system to a in-focus permissible range that is narrower that the in-focus permissible range of the contrast AF unit according to the results of detection, and in the event that an operation to press the release button 21 down half was has been performed during execution of live view display (#53 →Y), a focus adjustment operation using the contrast AF unit is carried out, and after that, if the release button 21 is pressed down fully (#107) a focus adjustment operation using the phase difference AF unit is carried out (#121).

Therefore, within this embodiment, when taking a picture from the live view display state, a rough focusing operation to the extent that it is not possible to confirm focus blur on the monitor is carried out by the contrast AF unit during live view display, and if the shooting operation is entered a high precision focus adjustment operation of a level appropriate to exposure is performed by the phase difference AF unit, which means that it is possible to carry out a focus adjustment operation with both a small time lag and high precision.

Also, within this embodiment there are provided first contrast AF unit (contrast AF circuit 253 etc. and contrast AF control #201-#253) for obtaining contrast information of the subject image from subject image data acquired by the image sensor 221, to guide the photographing optical system 101 to within a first in-focus permissible range based on this contrast information, second contrast AF unit (contrast AF circuit 253, contrast AF control of #201-#277) for guiding the photographing optical system 101 to a second in-focus permissible range that is narrower than the first in-focus permissible range based on contrast information, and phase difference AF unit (phase difference distance sensor 243 etc. and phase difference AF control of #121) for causing a movable mirror 201 to be placed in an optical path of the photographing optical system 101, receiving subject light flux reflected by the movable mirror 201 to detect a defocus amount of the photographing optical system, and guiding the photographing optical system 101 to a in-focus permissible range that is narrower that the in-focus permissible range of the first contrast AF unit according to the results of detection, and a first focus adjustment mode for carrying out focus adjustment of the photographing optical system 101 using a combination of the first contrast AF unit and the phase difference AF unit, and a second focus adjustment mode for carrying out focus adjustment of the photographing optical system 101 using only the second contrast AF unit, are selected.

With this embodiment, therefore, since the first focus adjustment mode using the combination of the first contrast AF unit and the phase difference AF unit, or the second focus adjustment unit using only the second contrast AF unit, is selected depending on the situation, it is possible to carry out a focus adjustment operation with a small time lag and high precision.

Further, within this embodiment, there is provided enlargement operation unit (enlargement button 34, #55-#75) for cropping an area of part of image data acquired during execution of the live view display operation and causing execution of enlarged live view display that carries out live view display, and control is performed so that in the event that the release button 21 is pressed down halfway during execution of live view display (#→Y) focus adjustment using the contrast AF unit is executed (#105), and after that, if the release button 21 is pressed down fully (#107) focus adjustment using the phase difference AF unit is executed (#121), while if the release button 21 is pressed down halfway during execution of enlarged live view display (#53 →Y) the contrast AF subroutine is executed (#105), and after execution of first contrast AF control to guide the photographing lens to within a first in-focus permissible range, second contrast AF control is executed to guide the photographing lens to within a second in-focus permissible range that is narrower than the first in-focus permissible range, and if the release button 21 is pressed down fully in a state where a second focus display is performed (#107) a focus adjustment operation is carried out using the phase difference AF unit (#113, #127).

Therefore, within this embodiment, when enlarged live view has been carried out, a focus adjustment operation using the phase difference AF unit is carried out after the release button 21 has been pressed down fully, which means that it is possible to carry out a focus adjustment operation with a small time lag and high precision.

Next, a second embodiment of the present invention will be described using FIG. 19 to FIG. 23. In the first embodiment, in the event of enlarged display at the time of live view display, high precision focus adjustment was continuously carried out using the second contrast AF, even in a state where first contrast AF achieved a focused state. In the second embodiment, phase difference AF is capable of multipoint ranging, and if enlarged display has been carried out at the time of live view display, high precision focus adjustment is carried out using phase difference AF for portions of enlarged display, in response to the release button 21 being pressed down fully.

Figure 2:
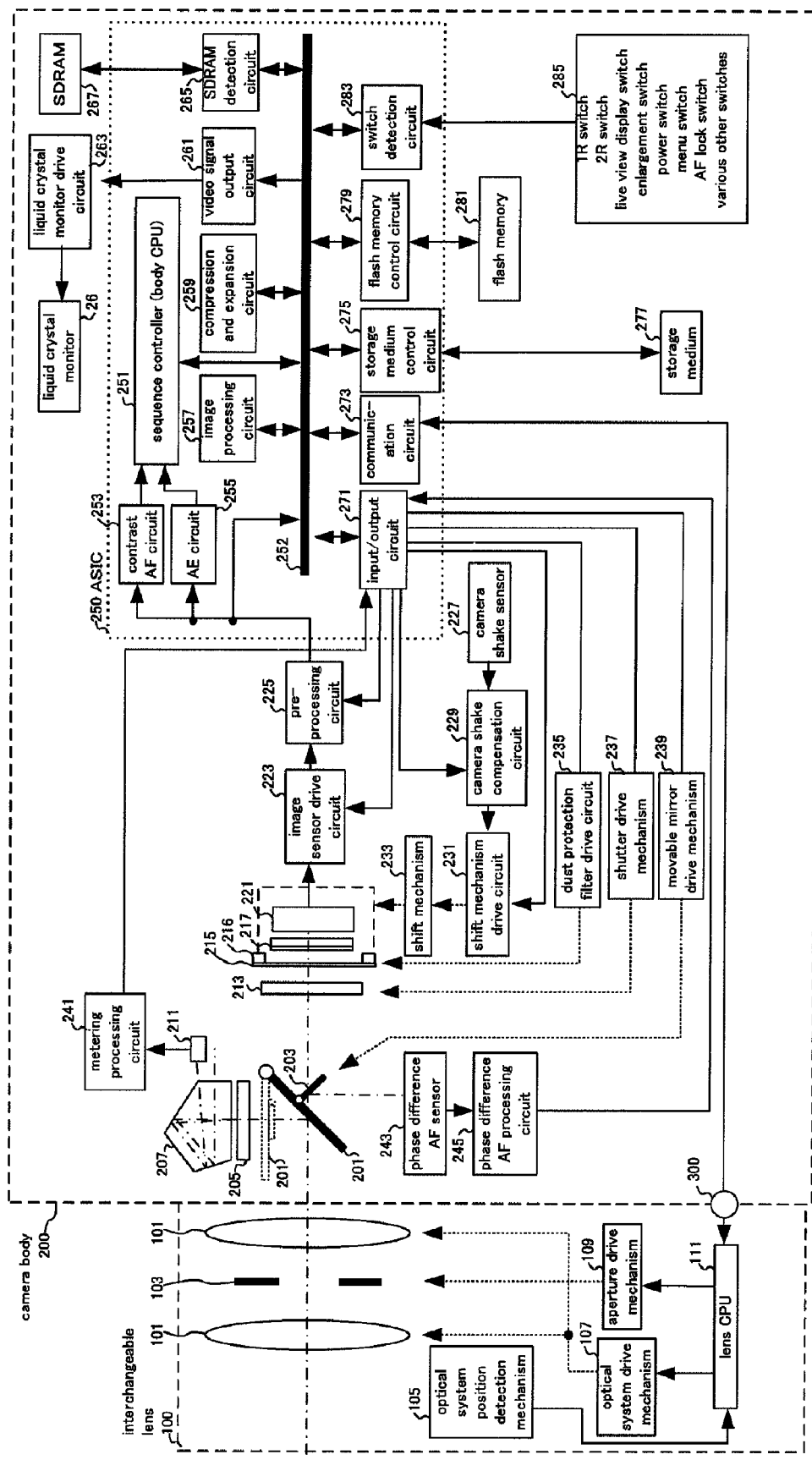
FIG. 2 is a block diagram showing the overall structure of a digital single lens reflex camera of a first embodiment adopting the present invention.

The second embodiment has similar external structure and electrical circuitry to that shown in FIG. 1 and FIG. 2 for the first embodiment, and the flowcharts shown in FIG. 6, FIG. 9, FIG. 10 and FIG. 11 of the first embodiment are replaced with FIG. 19 to FIG. 22. Accordingly, here description will center on points of difference from the first embodiment, and steps carrying out the same processing have the same reference numbers attached, and detailed description there of is omitted.

Figure 4:
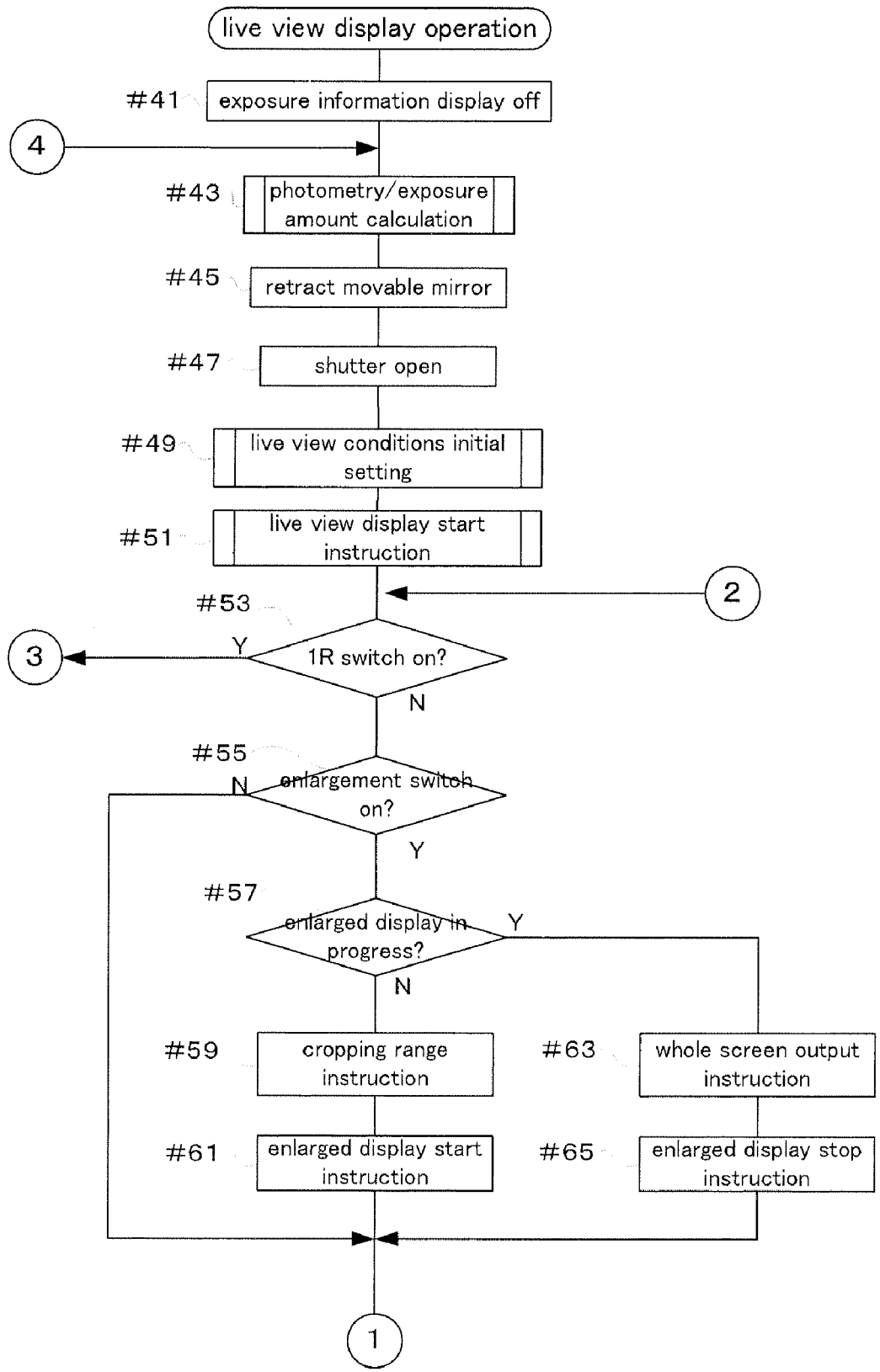
FIG. 4 is a flowchart showing a live view display operation of the first embodiment of the present invention.
Figure 5:
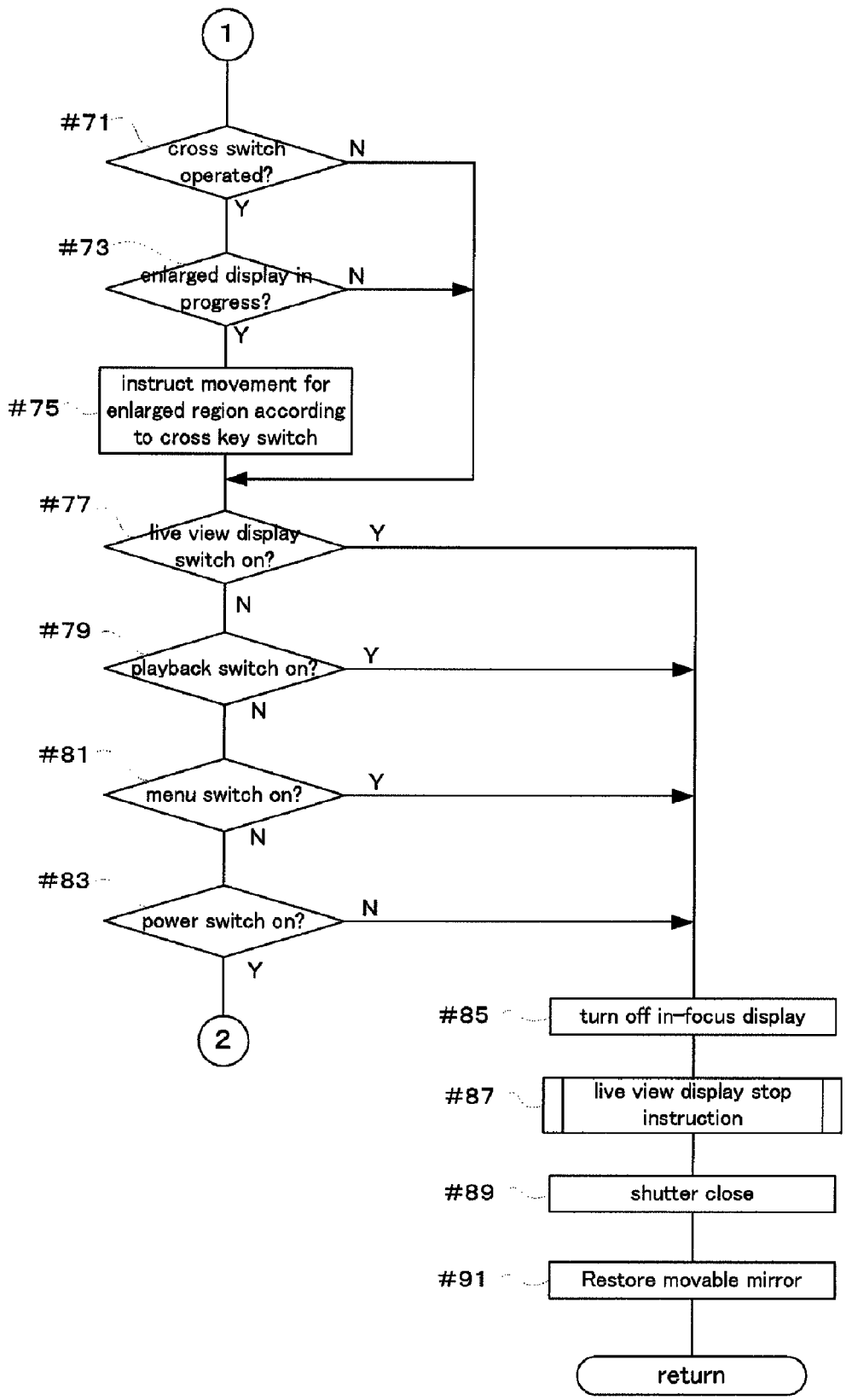
FIG. 5 is a flowchart showing a live view display operation of the first embodiment of the present invention.
Figure 19:
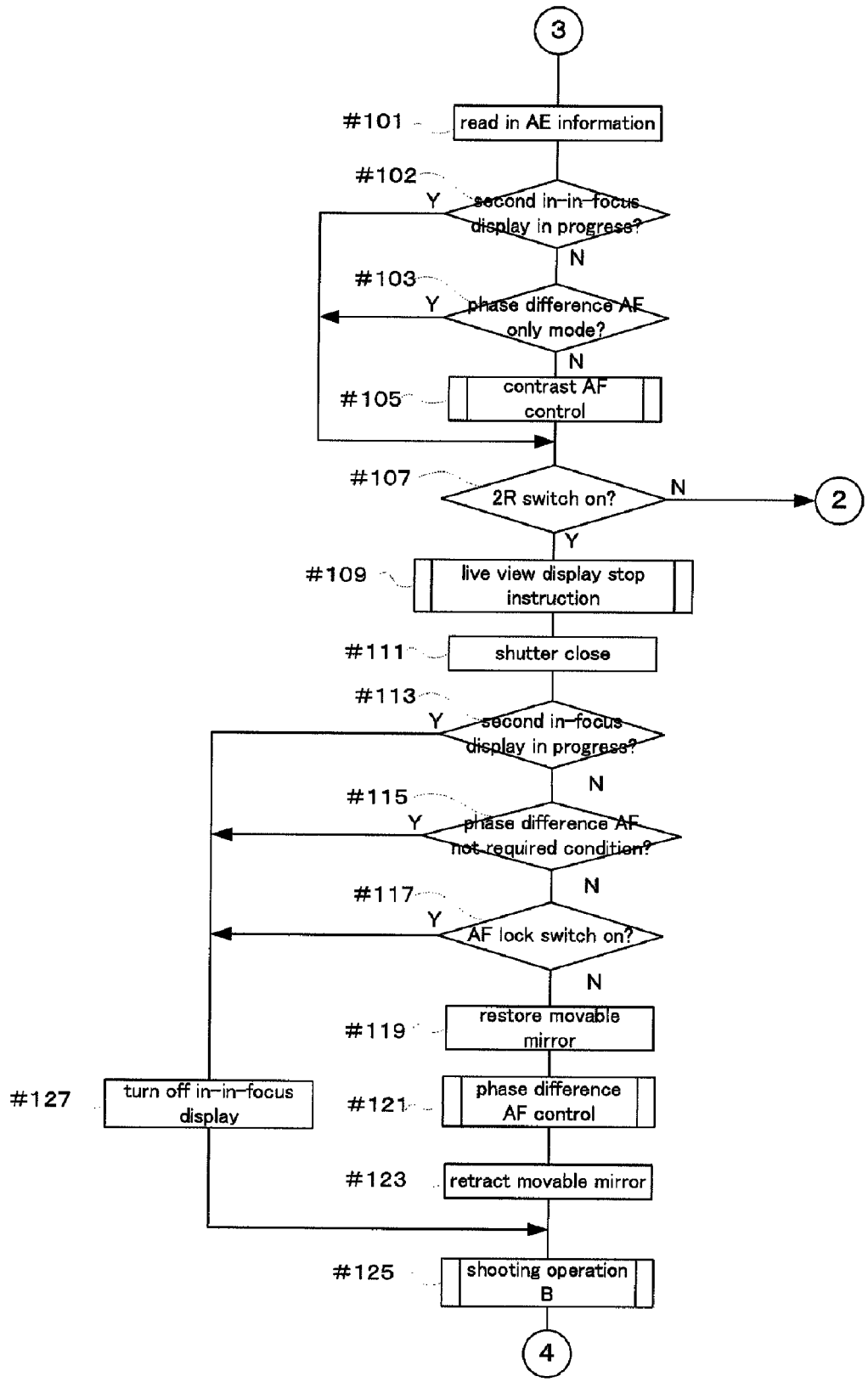
FIG. 19 is a flowchart showing a live view display operation of a second embodiment of the present invention.

The flowchart shown in FIG. 19 shows live view display operation, and in step #53 of the flowchart of FIG. 4 for the first embodiment, if the release button 21 is pressed down halfway, specifically, if the 1R switch is on, processing jumps to step #101. In step #101, similarly to the first embodiment, reading of AE information is performed.

It is next determined whether or not a second focus display is being carried out (#102). If the photographing optical system 101 achieves a second focus state using high precision contrast AF, the second focus display is activated (#277 in FIG. 22). After reaching the second focus state, in step #105, if the photographing optical system 101 is again driven using contrast AF operating precision is not good, and so in the event that the second focus state has been reached step #105 is skipped.

If the result of determination in step #102 is that the second focus display is not being performed, then similarly to step #103 of the first embodiment it is determined whether or not it is phase difference AF only mode (#103).

If the result of determination in step #103 is phase difference AF only mode, or of the result of determination in step #102 is that the second focus display is active, processing jumps to step #107, while if the result of determination in step #103 is not phase difference AF only mode, contrast AF control is carried out (#105). In this contrast AF control, control is performed so that the photographing optical system 101 reaches an in focus state based on contrast information from the contrast AF circuit 253. This phase contrast AF control will be described in detail later using FIG. 21 and FIG. 22.

After step #107 is the same as for the flowchart of FIG. 6 of the first embodiment and steps performing the same processing have the same reference numerals, with detailed description thereof being omitted.

Next, a sub-routine for phase difference AF control of step #121 (FIG. 19) and step #133 (FIG. 7) will be described using FIG. 20. This phase difference AF control is for obtaining defocus direction and defocus amount of the photographing optical system 101 with a well known phase difference method, using two peripheral light fluxes of the photographing optical system 101. It is possible to carry out AF with the same high degree of precision as high precision AF in contrast AF.

If the phase difference AF control subroutine is entered, it is determined whether or not enlarged display is in progress (#180). Specifically, in step #55 (FIG. 4) it is determined whether or not the enlarged display mode has been entered during live view display, and it is determined whether or not the release button has been pressed down fully in this state (#107, FIG. 19) and whether or not the subroutine for phase difference AF control has been entered. If the result of determination is that enlarged display is not in progress, all point focal point detection is carried out (#181).

In this step #181, defocus direction and defocus amount are detected for all points where detection is possible using the phase difference AF sensor 243 and the phase difference AF processing circuit 245. On the other hand, if the result of determination is that enlarged display is in progress, defocus direction and defocus amount are detected for points within the enlargement range, using a phase difference method. Points that can be ranged using the phase difference AF method are positions covered with a "+" mark in the exposure screen 321 shown in FIG. 23A (focus detection points 322), and in this example there are a total off 11 points.

Figure 23A:
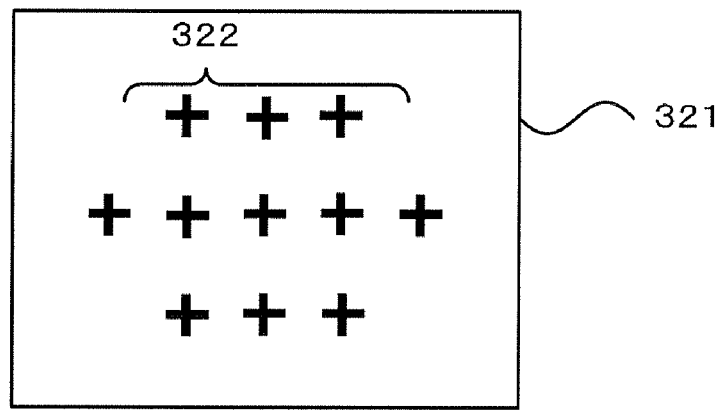
FIG. 23 is a drawing conceptually showing a relationship between focus detection point and enlargement range of the second embodiment of the present invention.
Figure 23B:
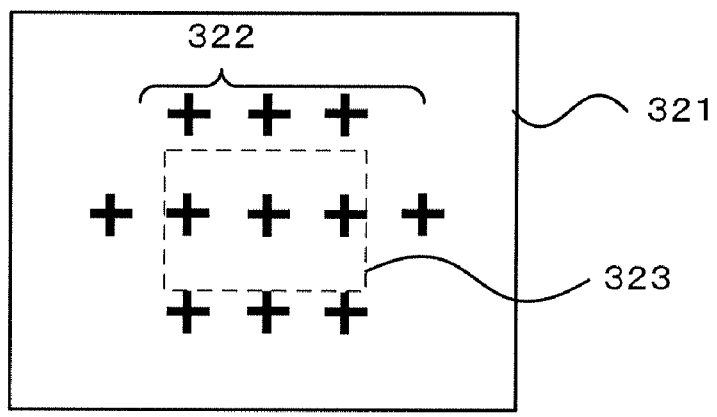
Figure 23C:
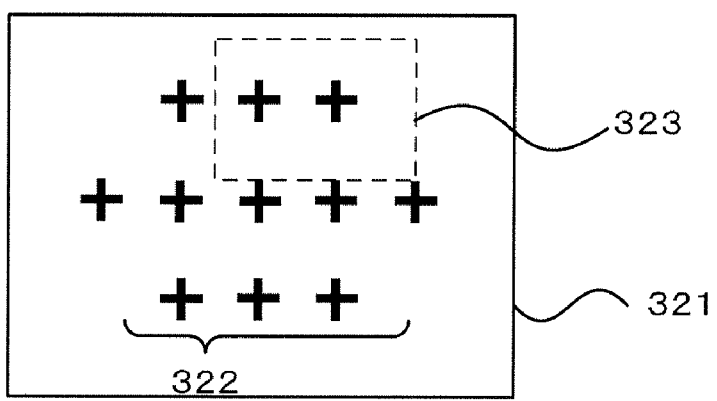

In step #181, focus detection is carried out for all of these focus detection points 322. Also, in enlarged display mode, live view display is enlarged display for the enlarged region 323 shown by the dotted line in FIG. 23B, and by operating the cross button 30 the enlarged region 323 shown by the dotted line is moved, as shown in FIG. 23C, for example. Accompanying movement of the enlarged region 323, the focus detection points 322 contained in the enlarged region 323 are also changed. In step #182, when the release button 21 has been pressed down completely, focus detection (defocus direction and defocus amount) is carried out for the focus detection points contained in the region of enlarged display, using a phase difference AF method.

Figure 9:
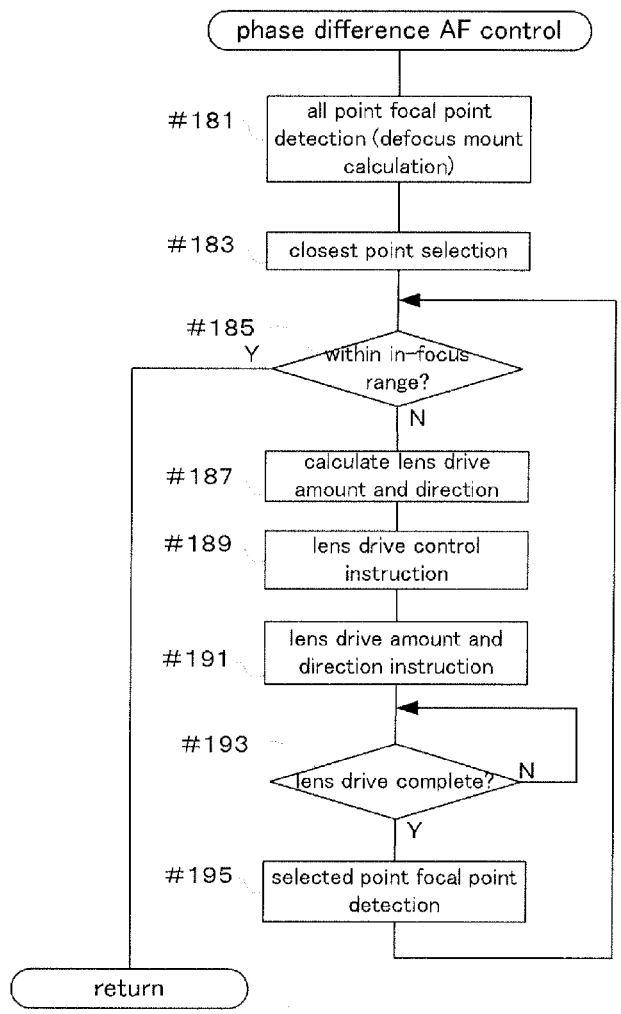
FIG. 9 is a flowchart showing phase difference AF control of the first embodiment of the present invention.

If the processing of step #181 or step #182 is carried out, then next selection of the closest point is carried out (#183), and processing after this step #183 is the same as that in the flowchart of FIG. 9 for the first embodiment, and so the same numerals are assigned to the same processes and detailed description thereof is omitted.

Figure 21:
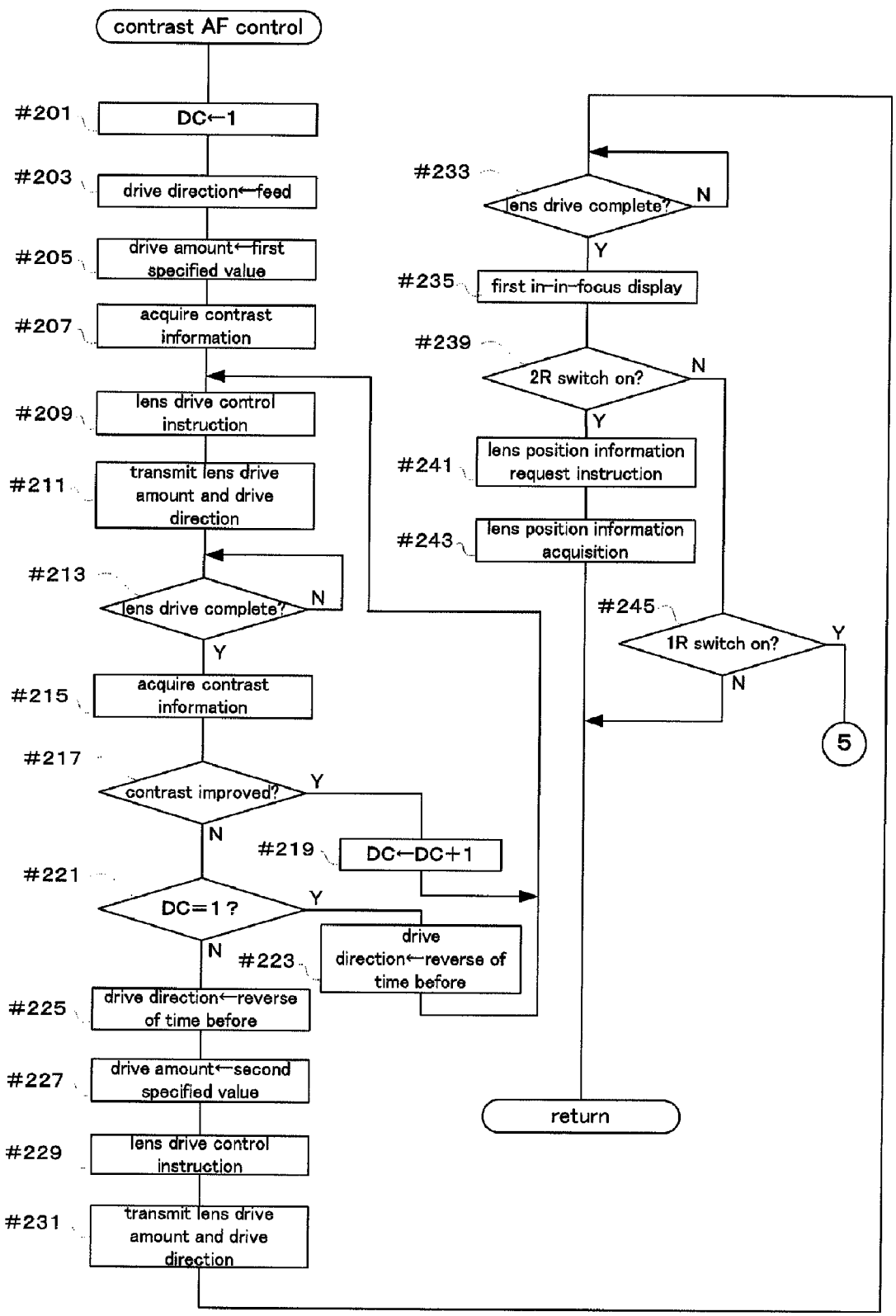
FIG. 21 is a flowchart showing contrast AF control of the second embodiment of the present invention.

Next, a sub-routine for contrast AF control of step #105 (FIG. 19) will be described using FIG. 21 and FIG. 22. As with the first embodiment, this contrast AF control is performing drive of the photographing optical system 101 so that contrast information of the contrast AF circuit 253 becomes maximum based on output of the image sensor 221. Also, as with the first embodiment, in the contrast AF control, there are two modes, namely high speed contrast AF (first contrast AF) that carries out AF control at high speed but with first focus precision of rough focus precision, and high precision AF (second contrast AF) that carries out AF control at low speed but with a second focus precision that is high focus precision.

If the contrast AF subroutine is entered, then as with the first embodiment the register DC is set and setting of drive direction and drive amount is carried out (#201-#205). Next, contrast information is acquired from the contrast AF circuit 253 (#207). In this case, when non-enlarged live view display is being carried out, contrast information for image data on the entire imaging screen is acquired. Also, at the time of enlarged live view display, when the 1R switch is turned on, the acquisition of the contrast information here is carried out based on image data cropped for enlarged display. This also applies to contrast information acquired in step #215 that will be described later. If contrast information is acquired, steps #209 and after are executed, but up to step #235 is the same as the first embodiment and so detailed description will be omitted.

In step #235, if the first focus display is carried out, it is next determined whether or not the release button 21 has been pressed down fully, that is, whether or not the 2R switch is on. In the first embodiment, determination as to whether or not enlarged display was in progress was carried out before determination for the 2R switch (#237 in FIG. 10), and if the enlarged display was in progress second contrast AF was executed. Differing from this, with the second embodiment, when enlarged display is in progress high precision focus adjustment is carried out for the subject corresponding to the enlarged display portion using multipoint phase difference AF, and so determination of whether or not enlarged display is in progress is omitted.

Figure 22:
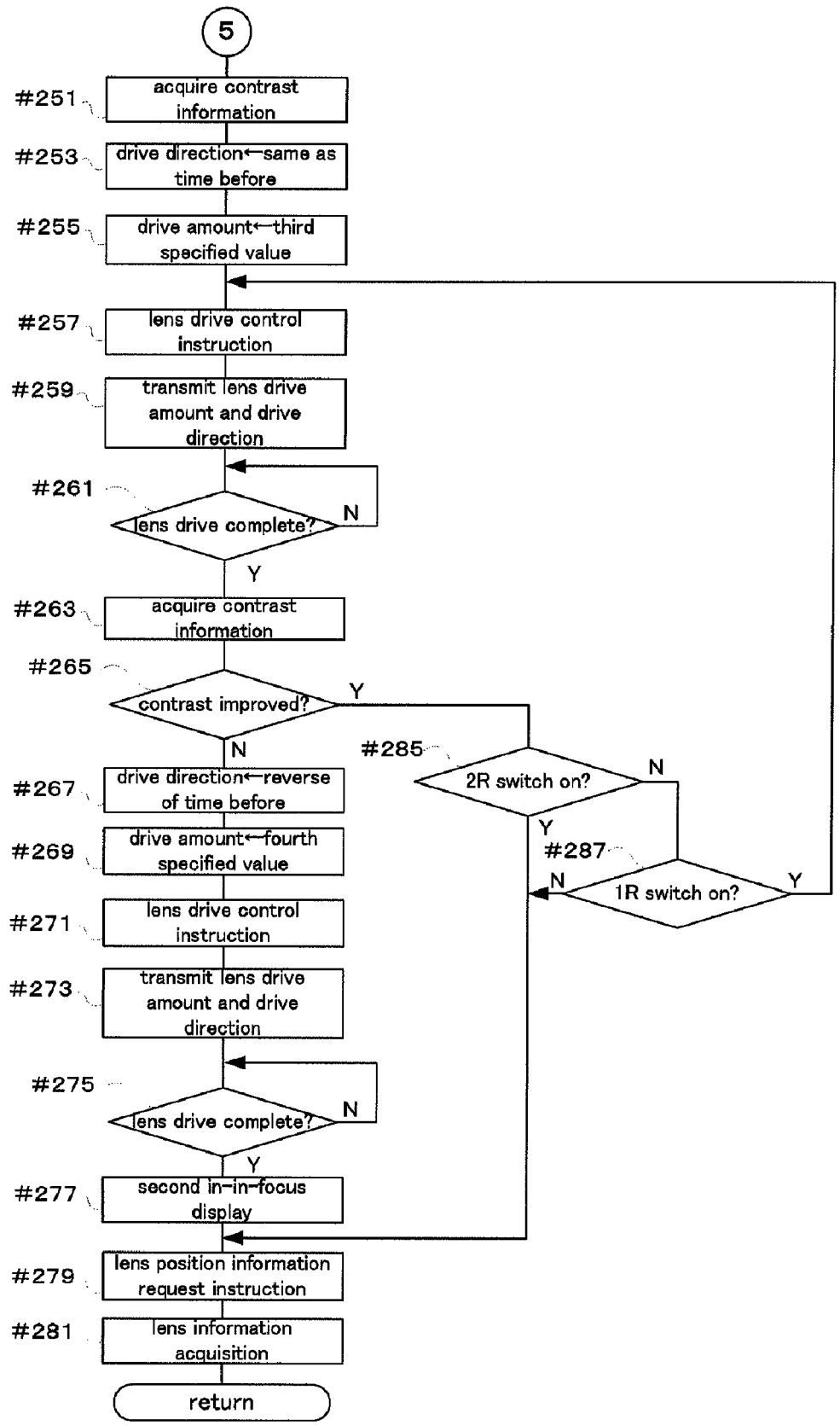
FIG. 22 is a flowchart showing contrast AF control of the second embodiment of the present invention.

If the result of determination in step #245 is that the 1R switch is on, processing advances to step #251 shown in FIG. 22. If the flowchart shown in FIG. 22 is compared to the flowchart of FIG. 11 for the first embodiment, it is the same apart from the fact that step #283 is omitted. Specifically, in the first embodiment, during enlarged display, it is permissible to determine the state of the 2R switch in step #285 until the second focus display state is reached through the high precision second contrast AF. Differing from this, in the second embodiment, even if enlarged display is in progress, if the 2R switch is on there is a transition to a release operation, and high precision focus adjustment is carried out during the release operation using multipoint phase difference AF. The determination as to whether or not the enlarged display is in progress in step #283 of the first embodiment is therefore omitted.

Figure 20:
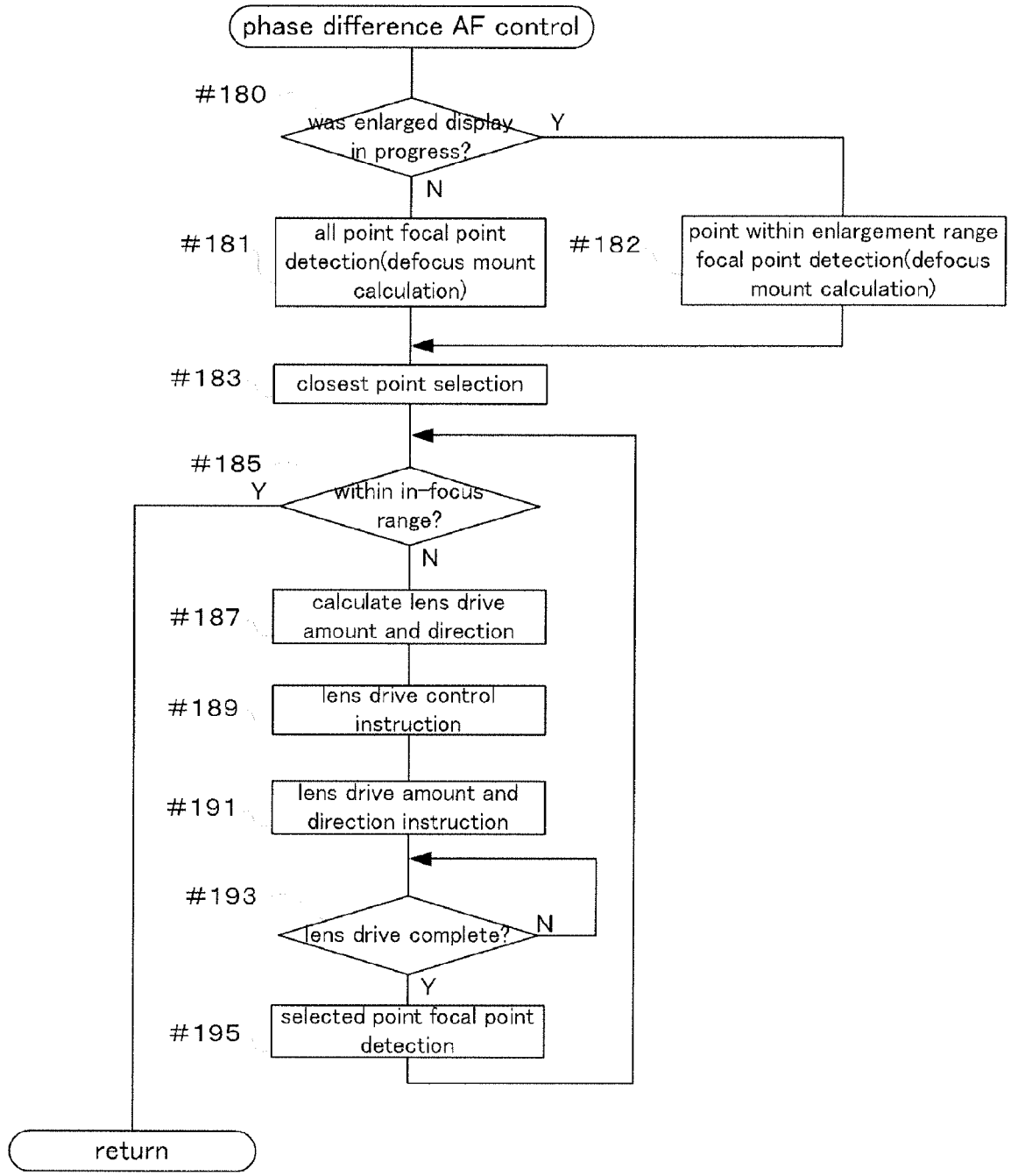
FIG. 20 is a flowchart showing phase difference AF control of the second embodiment of the present invention.

In this way, in the second embodiment of the present invention, if the release button is fully operated (#53 →Y #107 Y) when enlarged display is being carried out in live view display mode (#55 →#75 in FIG. 4), and there is a transition to a shooting operation, defocus amount is detected using a phase difference AF method for detection points contained in the enlarged display region (#182 of FIG. 20). It is therefore possible to carry out automatic focus adjustment for a region where the photographer has performed enlarged display, that is, for a subject the photographer wants to focus on. Also, since phase difference AF is not carried out for all focus detection points, it is possible to reduce the ranging time, and it is possible to ensure higher precision focus adjustment using phase difference AF.

Further, in the determination of step #113 in this embodiment, if there is the second focus display, that is, focus has been achieved with high precision contrast AF, the phase difference AF of step #121 is omitted. Specifically, within this embodiment, there are provided a first focus adjustment mode for carrying out a combination of high speed contrast AF and phase difference AF, and a second focus adjustment mode for carrying out focus adjustment using high precision contrast AF after high speed contrast AF, but it is possible to reduce time lag by the time required for phase difference AF by omitting the phase difference AF. Also, with high precision contrast AF, it is possible to achieve high precision focus adjustment with the same degree of precision as phase difference AF, and it is possible to ensure sufficient focusing precision. In the event that the release button 21 has been pressed down halfway during enlarged display, automatic focus adjustment has been carried out using contrast AF and the second focus display has been activated, sufficient focus precision has been achieved, and so phase difference AF is omitted and the time required for automatic focus is reduced.

As has been described above, within this embodiment there are provided contrast AF unit (contrast AF circuit 253 etc. and #105 contrast AF control) obtaining contrast information of the subject image from subject image data, to guide the photographing optical system 101 to within a specified in-focus permissible range (first focus range) based on this contrast information, phase difference AF unit (phase difference AF sensor 243 and phase difference AF control 245 etc.) including the phase difference AF sensor 243 for detecting a defocus amount of the photographing optical system 101 at multiple points within an exposure screen, and guiding the photographing optical system 101 to a in-focus permissible range that is narrower than the in-focus permissible range of the contrast AF unit according to any of the multiple defocus amount information detected by the phase difference AF sensor 243, and control unit (body CPU 251) for controlling so that in the event that an operation to press the release button 21 down halfway has been performed during execution of the live view display operation (#53 →Y), a focus adjustment operation using the contrast AF unit is carried out (#105), and after that, if the release button 21 is pressed down fully (#107), a focus adjustment operation using the phase difference AF unit is carried out (#121). When the liquid crystal monitor 26 is capable of enlarged display of part of the exposure screen (enlarged display mode, refer to FIG. 13), the phase difference AF unit, in a state where enlarged live view display is being carried out, detects defocus amount for focus detection points contained in the enlarged display region (FIG. 23(B) and FIG. 23(C)) (#182).

Also, in the second embodiment there are provided enlarged display unit (pre-processing circuit 225, #55-#75) for carrying out enlarged display on the liquid crystal monitor 26 by cropping part of the subject image data according to operation of the enlargement button 34, and phase difference AF unit (phase difference AF sensor 243 and phase difference AF processing circuit 245 etc.), including the phase difference AF sensor 243 for detecting defocus amount of the photographing optical system 101 at a plurality of points within the exposure screen using a phase difference method, for guiding the photographing optical system 101 to within a in-focus permissible range according to any of the defocus amount information detected by the sensor 243. In the event that the release button 21 has been operated, defocus amount is detected using the phase difference AF unit for focus detection points (Refer to FIG. 23B and FIG. 23C) that exist in a range where enlarged display is carried out by the enlarged display unit (#182) and a focus adjustment operation is carried out for the photographing lens based on the detection results (#185-#195).

In this way, with the second embodiment of the present invention, defocus amount for focus detection points contained within a region where enlarged display is carried out is detected using a phase difference AF method, and it is possible to achieve focus for a subject the photographer intended. It is also possible to reduce ranging time by carrying our ranging for all focus detection points.

In the second embodiment, the closest point is selected from among focus detection points, in the phase difference AF control subroutine (#183), but this is not limiting, and it is also possible to select intermediate values of a plurality of focus detection results, or to suitably process a plurality of focus detection results using evaluative calculation.

Next, a third embodiment of the present invention will be described using FIG. 24 to FIG. 29. In the first and second embodiments, in the event that a macro lens or the like is attached, and depth of field is shallow, the method of focus adjustment is not particularly changed. With the third embodiment, in such a case focus adjustment is carried out using high precision contrast AF.

The third embodiment has similar external structure and electrical circuitry to that shown in FIG. 1 and FIG. 2 for the first embodiment, and the flowcharts shown in FIG. 3 to FIG. 6, FIG. 10 and FIG. 11 of the first embodiment are replaced with FIG. 24 to FIG. 29. Accordingly, here description will center on points of difference from the first embodiment, and steps carrying out the same processing have the same reference numbers attached. With the third embodiment, in order to simplify the description the enlarged display mode is omitted.

Figure 24:
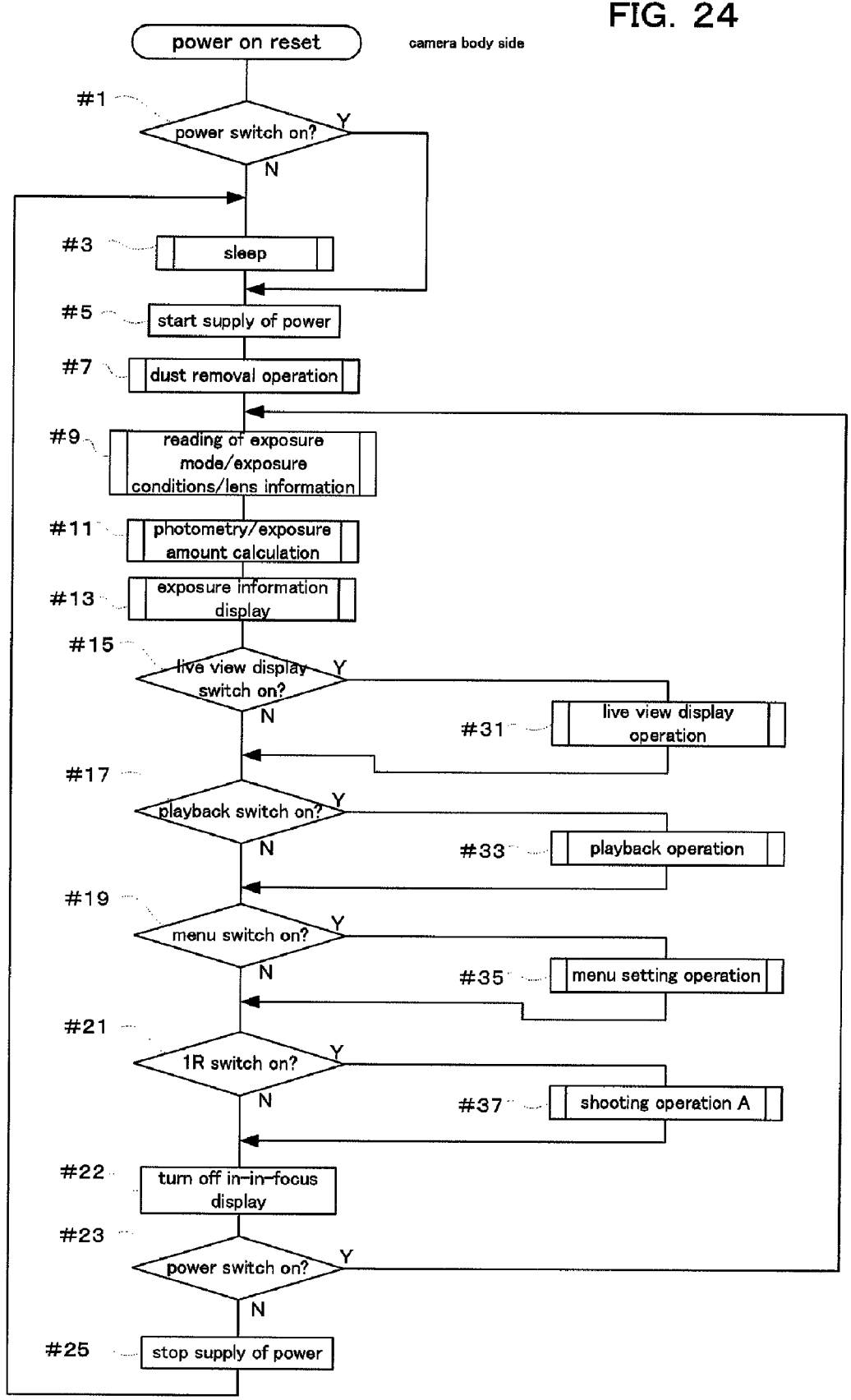
FIG. 24 is a flowchart showing a power-on reset operation, in the camera body, of a third embodiment of the present invention.

The flowchart shown in FIG. 24 shows a power on reset operation, and carries out almost the same processing as in the power on reset of FIG. 4 for the first embodiment. However, if the result of determination in step #21 is that the 1R switch is not on, focus display is turned off (#22). As will be described later, if a focused state is reached using contrast AF and a subject is focused on, a first focus display 311 and a second focus display 312 as shown in FIG. 14A and FIG. 14B are displayed (#235 in FIG. 10 and #277 in FIG. 11, and so if these focus displays are active they are turned off. In the first and second embodiments, the focus display was turned off in step #85, and besides this step, there is no problem in adding step #22 as with the third embodiment, and turning off the focus display in this step.

Figure 25:
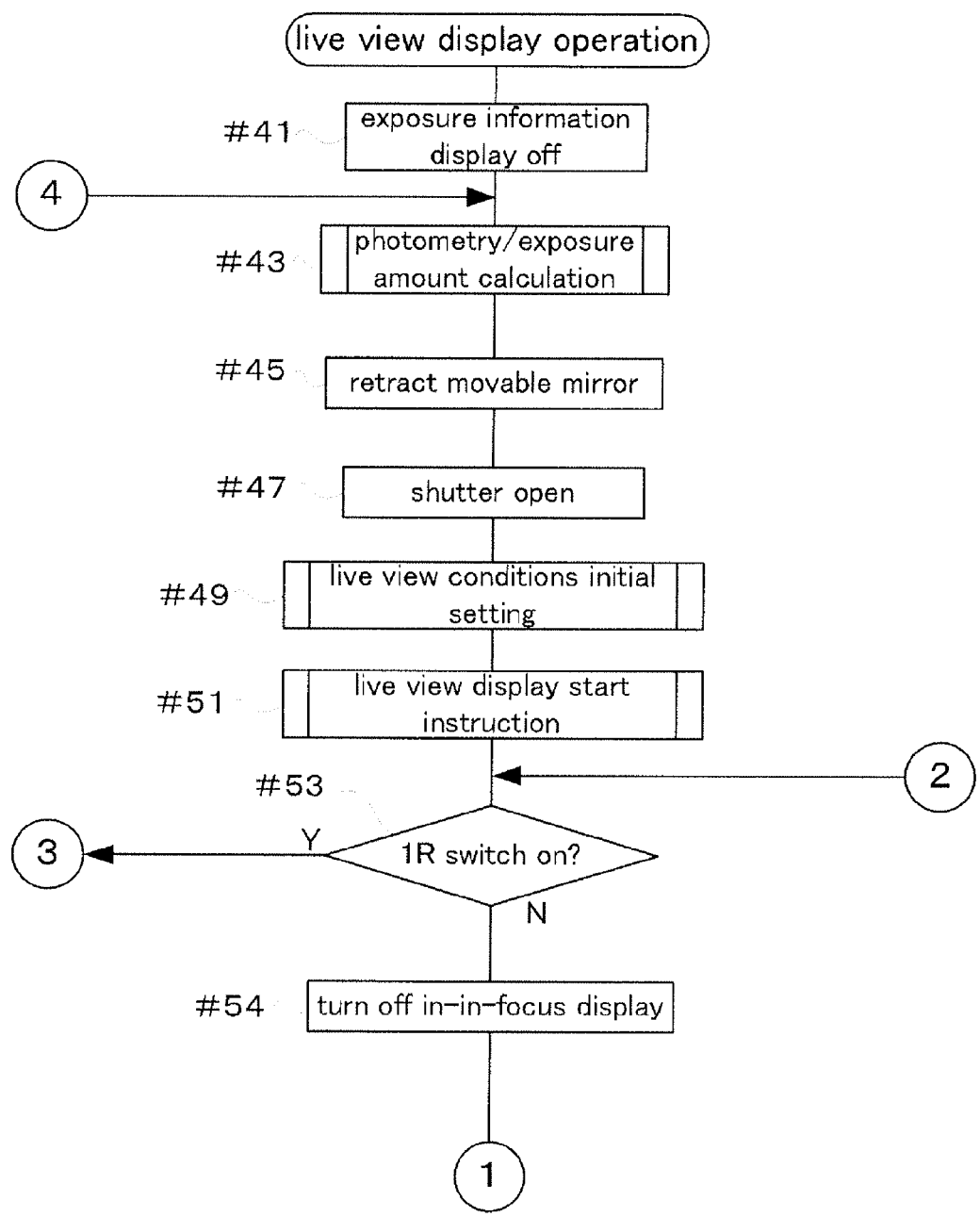
FIG. 25 is a flowchart showing a live view display operation of the third embodiment of the present invention.
Figure 26:
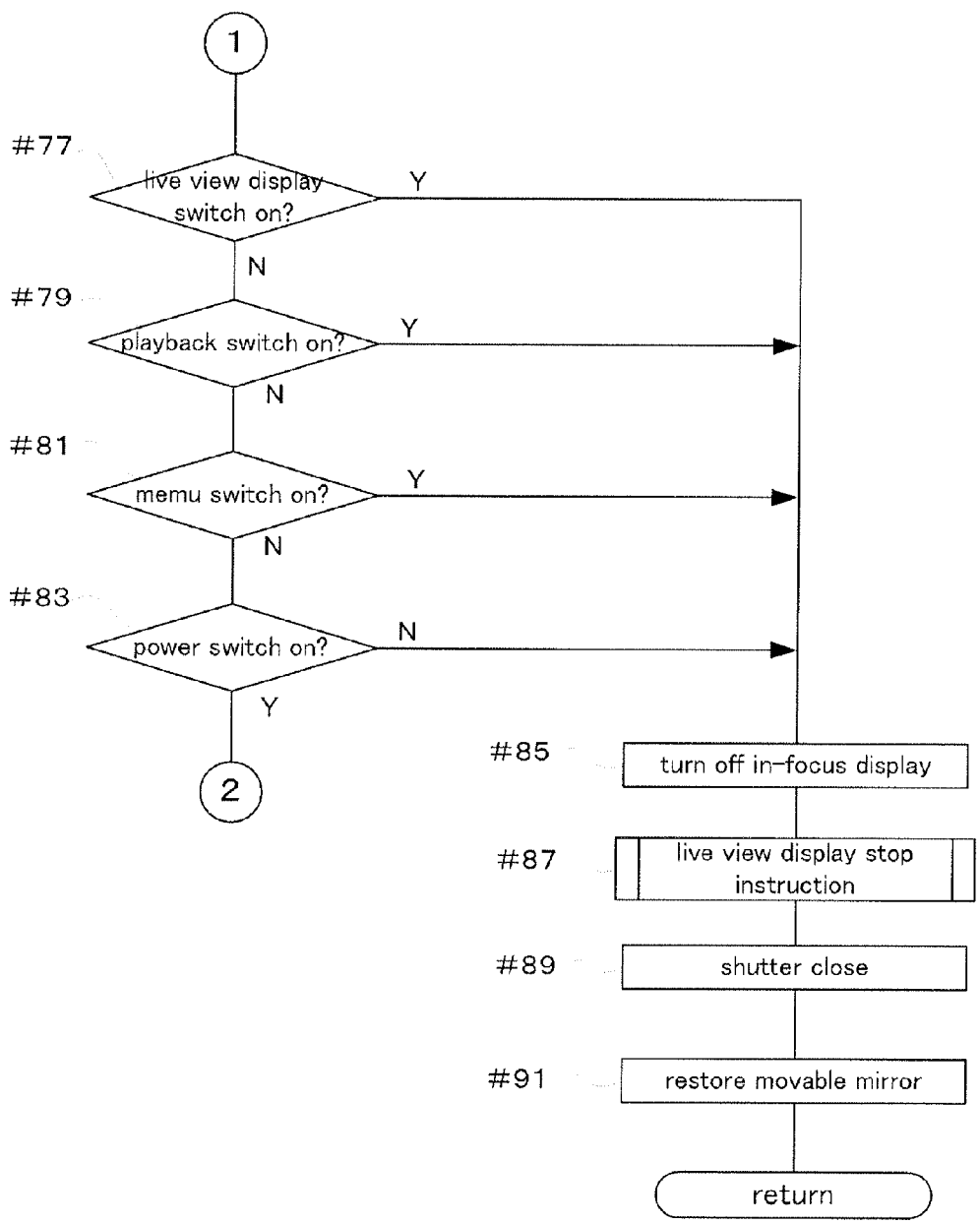
FIG. 26 is a flowchart showing a live view display operation of the third embodiment of the present invention.

Next, a subroutine for the live view display operation of step #31 will be described using FIG. 25 to FIG. 27. This live view display operation differs from the first embodiment only in that the enlarged display mode is omitted, and the determination of the second focus display in step #102 of the second embodiment is added, and so description will center of points of difference.

If the live view display operation subroutine is entered and the result of determination in step #53 is that the 1R switch is off, the focus display is turned off, the same as in step #22 (#54). In the first embodiment, in step #55 to step #77, processing for enlarged display mode was carried out, but with this embodiment the enlarged display mode is omitted.

Figure 27:
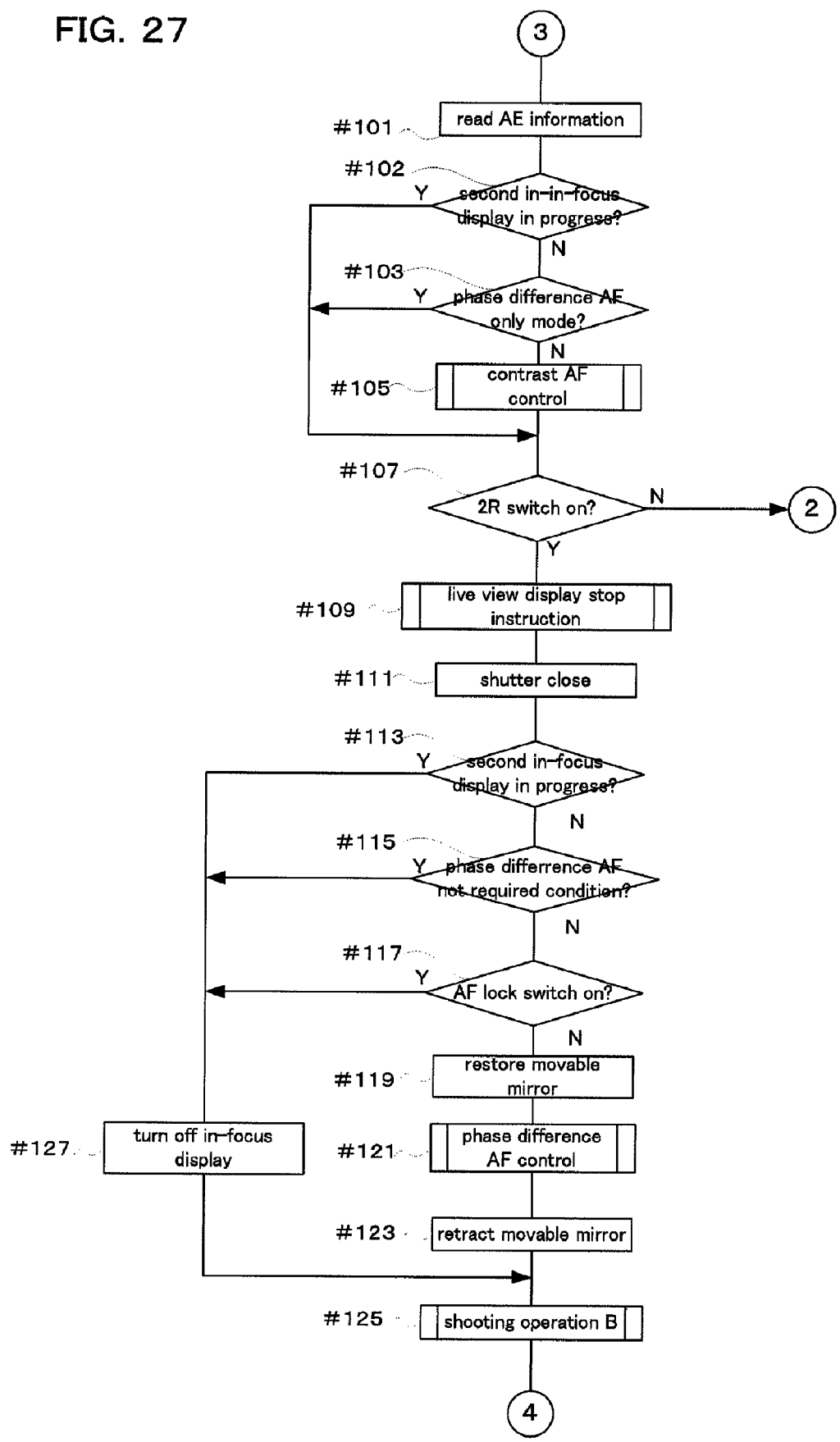
FIG. 27 is a flowchart showing a live view display operation of the third embodiment of the present invention.

Also, if the result of determination in step #53 is that the 1R switch is on, AE information is read in step #101, and then, as with the second embodiment, whether or not the second focus display is active is determined (#102 in FIG. 27). As will be described later, if the photographing optical system 101 achieves a focus state using high precision second contrast AF control, the second focus display is activated (#277 in FIG. 29). After reaching the focus state with high precision, in step #105, if the photographing optical system 101 is again driven using contrast AF operating precision is not good, and so in the event that the focus state has been reached step #105 is skipped.

Figure 28:
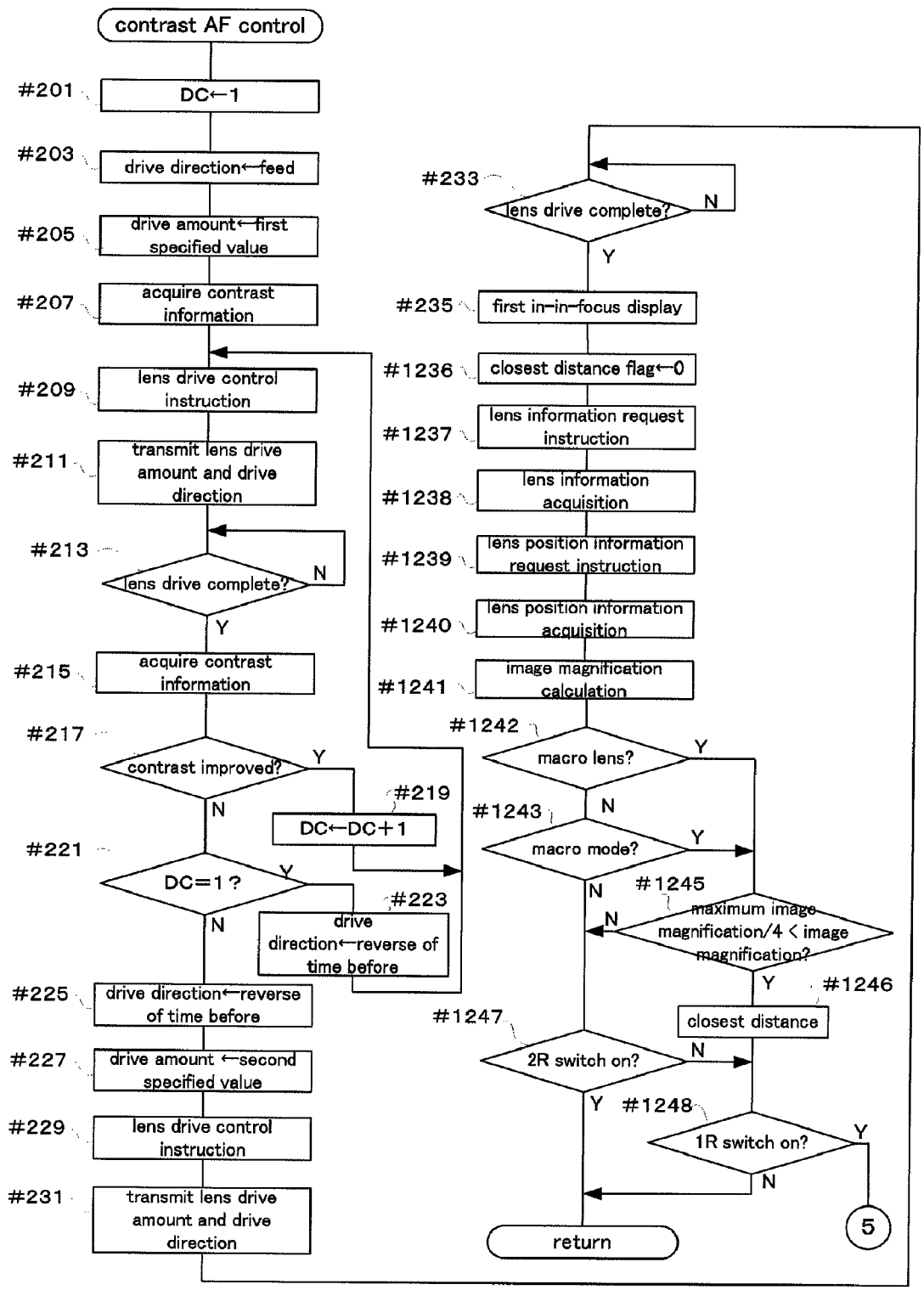
FIG. 28 is a flowchart showing contrast AF control of the third embodiment of the present invention.

Next, a sub-routine for the contrast AF control of step #105 (refer to FIG. 27) will be described using FIG. 28 and FIG. 29. If the contrast AF control subroutine is entered, contrast AF is executed from step #201 with a first focus precision, and first focus display is carried out if a first focus state is reached (#235), but since these steps are the same as for the case of the first embodiment they are assigned the same reference numerals as in the steps for carrying out the same processes in FIG. 10, and detailed description is omitted.

If the first focus display is carried out, a short distance flag is set to 0 (#1236). This short distance flag is a flag that is set to 1 when a focus position of the photographing optical system 101 is more to a short distance side than a specified magnification exposure ratio or specified distance. Next, an instruction for a lens information request is issued to the lens CPU 111 (#1237), and the type of interchangeable lens such as macro lens, maximum image magnification and other lens information is acquired (#1238).

Further, a request for lens information is issued to the lens CPU 111 (#1239), lens position information, namely focus position information for the photographing optical system 101, is acquired (#1240), and an image magnification is calculated (#1241). The image magnification is calculated based in lens position information and lens information.

Next, it is determined, based on the acquired lens information, whether or not the attached interchangeable lens is a macro lens. If the result of determination is that the interchangeable lens is not a macro lens, it is determined whether or not an exposure mode that was read in step #9 (FIG. 24) is macro mode (#1243). Macro mode is an exposure mode adopted for taking a picture of the subject at a short distance.

If the result of determination in step #1242 is that the lens is a macro lens, or if the result of determination in step #1243 is that macro mode has been set, it is determined whether or not the image magnification is ¼ or greater the maximum image magnification (#1245). If the result of determination in step #1254 is Y, the short distance flag is set to 1 (#1246).

If the result of determination in step #1245 is N, or if the result of determination in step #1243 is that macro mode has not been set, it is determined whether or not the 2R switch is on (#1247). If the result of determination is that the 2R switch is on, the shooting operation should be transferred to and the original routine is returned to. On the other hand, if the 2R switch is not on, or the short distance flag has not been set to 1 in step #1246, it is determined whether or not the 1R switch is on (#1248). If the result of determination is that the 1R switch is off the original routine is returned to, while if the 1R switch is on high precision second contrast AF is carried out in step #1251 (FIG. 29) and after.

In step #1246 setting the short distance flag to 1 means that in a state where a macro lens has been fitted or macro mode has been set, the image magnification is ¼ or greater the maximum image magnification, and is a state in which the photographer intends to focus on a subject at a short distance. When the focus position is towards the short distance side, the depth of field is shallow, which means that it is preferable to not make a transition to the shooting operation until high precision second contrast AF control is complete. Therefore, if the short distance flag has been set to 1, the determination in step #1247 as whether or not the 2R switch is on is not carried out.

Figure 29:
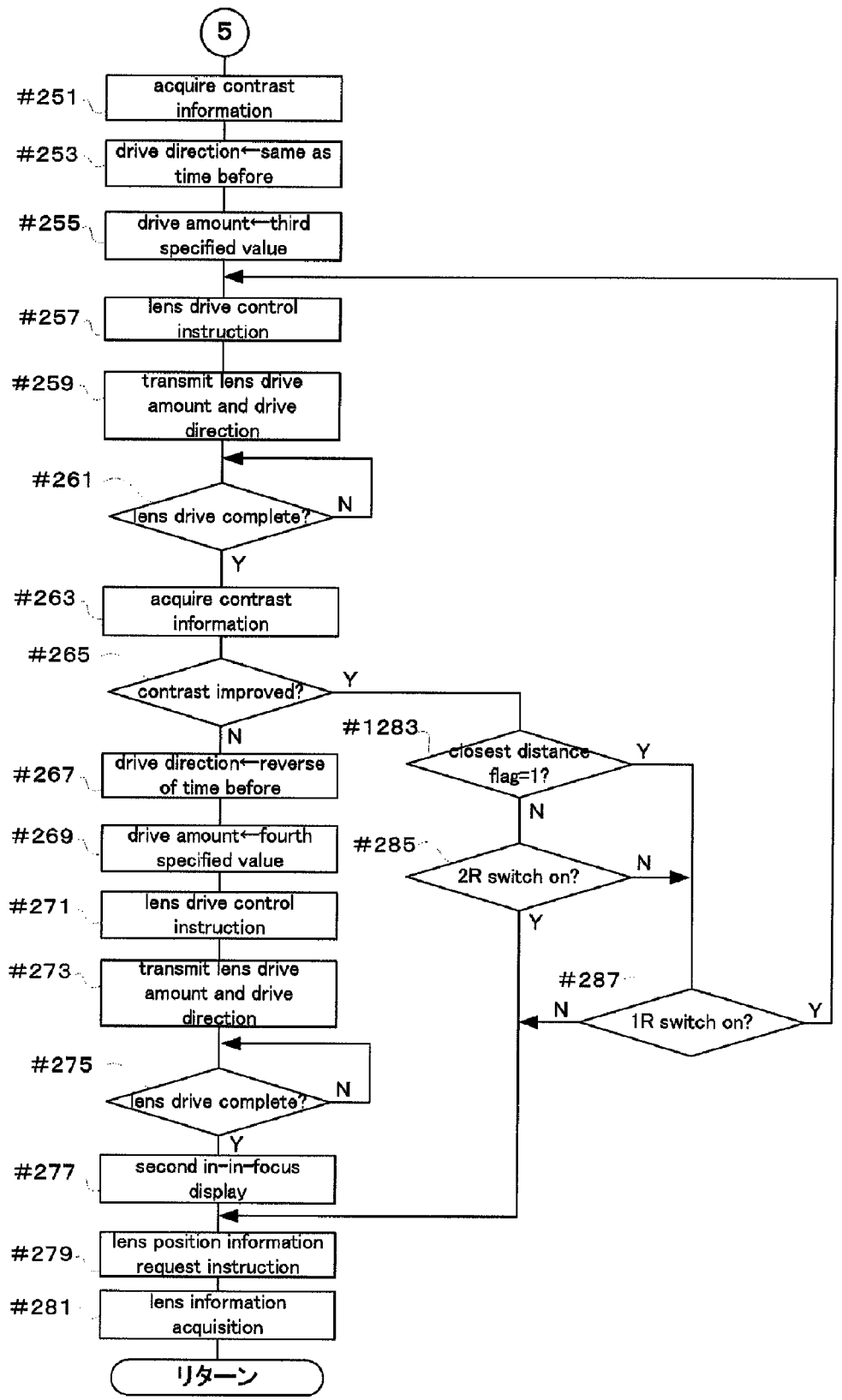
FIG. 29 is a flowchart showing contrast AF control of the third embodiment of the present invention.

If the result of determination in step #1248 is that the 1R switch is on, contrast information is acquired (#251 in FIG. 29). In steps #251 to step #281 high precision second contrast AF control is carried out, but since these steps are the same as the case of the first embodiment steps for carrying out the same processing as FIG. 11 are assigned the same reference numerals and detailed description is omitted.

In step #265 it is determined whether or not contrast information has improved over the time before, and if the result of determination is that contrast has improved it is determined whether or not the short distance flag is 1 (#1283), and it is determined whether or not the 2R switch is on (#285) If the results of these determinations are that the short distance flag is 1, or that the short distance flag is not 1 and the 2R switch is not on, it is then determined whether or not the 1R switch is on (#287).

If the results of determination in steps #1283, #285 and #287 are that the short distance flag is 1, or that the short distance flag is not 1 and the 2R switch is off, and the 1R switch is on, processing returns to step #257, and the above described steps are repeated as long as contrast is improved. On the other hand, if the short distance flag is not 1 and the 2R switch is on, processing jumps to step #279, and after the processing of steps #279 and #281 the original routine is returned to. Within this embodiment, after carrying out the first focus display, when second contrast AF is being carried out, if the short distance flag is not 1, the second contrast AF is interrupted if the 2R switch is turned on, but if short distance flag is 1 the state of the 2R switch is not detected and so the second contrast AF is not interrupted even if the 2R switch is on.

Figure 11:
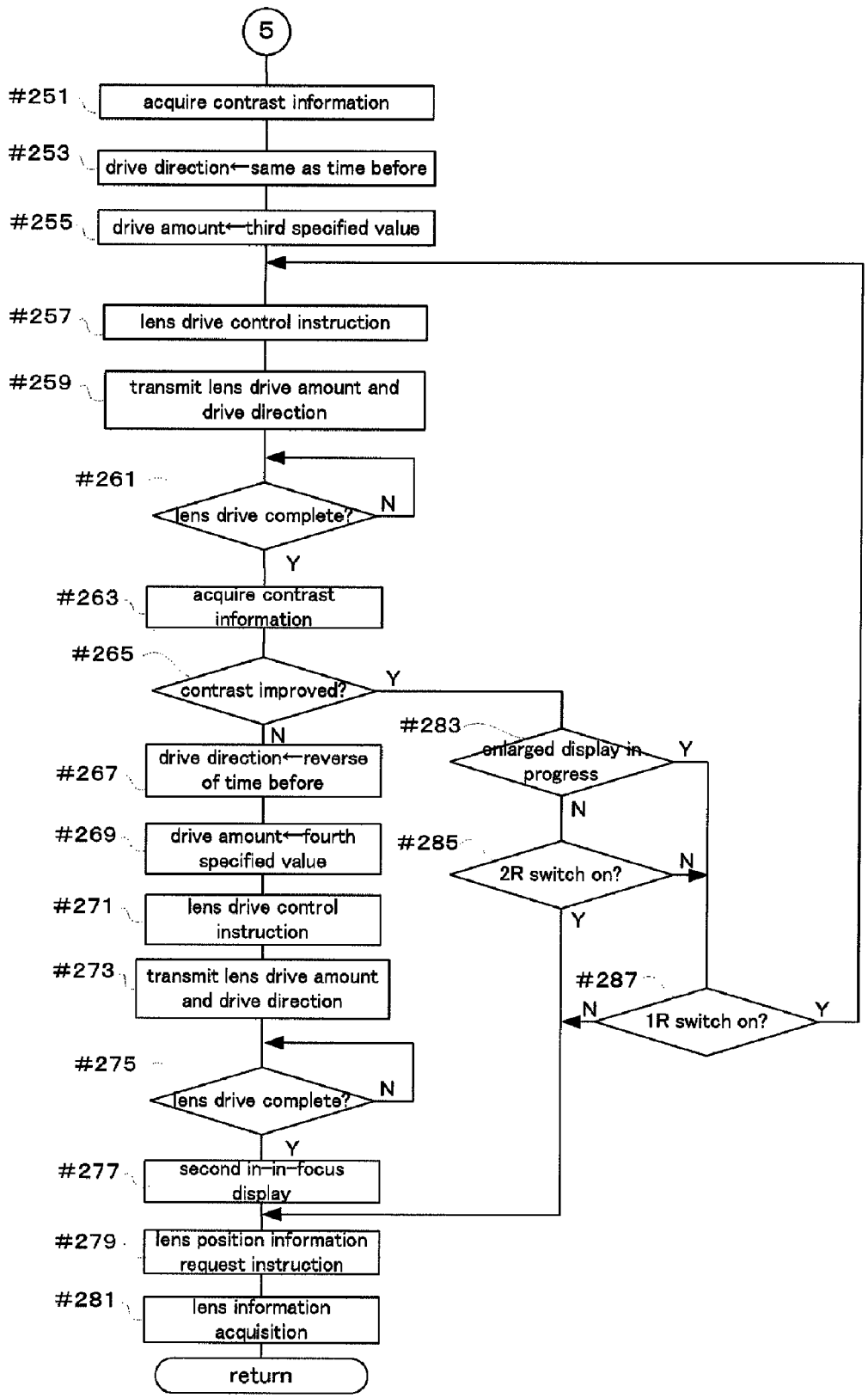
FIG. 11 is a flowchart showing contrast AF control of the first embodiment of the present invention.

Processing advances to step #257 or step #279 depending on the results of determination in step #285 and step #287, but since other operations are the same as for the first embodiment, steps for carrying out the same processing as FIG. 11 are assigned the same reference numerals and detailed description is omitted.

In this manner, in the third embodiment of the present invention, in the case where image magnification at the time of first focus using first contrast AF control is larger than ¼ the maximum image magnification of the fitted interchangeable lens 100 (Y at step #1245), that is, when the subject is at a short distance, in other words when focus is in a region of shallow depth of field, operation is carried out up to high precision second contrast AF control. Specifically, at the time of first contrast AF control, in the event that the subject is to the short distance side (a shallow depth of field region), the short distance flag is set, and at the time of second contrast AF control a transfer is not made to the shooting operation (if the short distance flag has been set in #1283, determination of the 2R switch in #285 is not carried out) even if the release button 21 has been pressed down fully and the 2R switch is on, until a high precision focus state has been reached (#277). If the result of determination is that the short distance flag has been set to 1, the second contrast AF is selected.

If the subject is to the short distance side (when in a shallow depth of field region), according to this embodiment high precision contrast AF control is performed, and so it is possible to perform in focus photography. In this embodiment, it is determined in step #1245 whether or not the image magnification is larger than ¼ of the maximum image magnification, but this determination value can be appropriately changed taking into consideration the characteristics of the photographing lens etc. Also with this embodiment, the determination of step #245 is performed with image magnification, but it can also be carried out using subject distance. Also, the depth of field varies according to focal length of the interchangeable lens 100, aperture value at the time of exposure etc., and so it goes without saying that it is also possible to carry out determination taking into consideration these characteristic values.

Further, with the third embodiment of the present invention, determination is carried out as to whether or not macro mode has been set as an exposure mode, but this is not limiting, and it is also possible to make the object of determination an exposure mode that has a shallow depth of field region, such as portrait mode. Similarly, with this embodiment it is determined whether or not a lens is a macro lens, but there is no problem in making determination based on a minimum subject distance of the interchangeable lens 100.

Further, within this third embodiment there are provided first contrast AF unit (contrast AF circuit 253 etc. and #201-#253) for obtaining contrast information of the subject image from image data, to guide the photographing optical system 101 to within a first in-focus permissible range based on this contrast information, second contrast AF unit (contrast AF circuit 253 etc., #251-#287, #1283) for guiding the photographing optical system 101 to a second in-focus permissible range that is narrower than the first in-focus permissible range based on contrast information, determination unit (#236-#246) for determining whether or not the photographing optical system 101 is focused in a shallow depth of field region, and control unit (body CPU 251, branch at #1283) for, when the release button 21 has been operated halfway during execution of the live view display operation, selecting either to guide the photographing optical system 101 to a first in-focus permissible range using the first contrast AF unit, or to further guide the photographing optical system 101 to a second in-focus permissible range using the second contrast AF unit, based on the result of determination by the determination unit.

Further, within this third embodiment there are provided first contrast AF unit (contrast AF circuit 253 etc. and #201-#235) for obtaining contrast information of the subject image from image data, to guide the photographing optical system 101 to within a first in-focus permissible range based on this contrast information, second contrast AF unit (contrast AF circuit 253 etc., #251-#287) for guiding the photographing optical system 101 to a second in-focus permissible range that is narrower than the first in-focus permissible range based on contrast information, determination unit (#236-#246) for determining type or exposure mode of the photographing optical system 101, and control unit (body CPU 251, branch at #1283) for, when the release button 21 has been operated halfway during execution of the live view display operation, selecting either one of the first contrast AF unit or the second contrast AF unit, based on the result of determination by the determination unit.

In this way, with the third embodiment of the present invention, it is determined whether or not exposure is carried out in a region of shallow depth of field, and control by the contrast AF control unit is varied depending on the result of determination, which unit that it is possible to perform focus adjustment with a small time lag and with high precision.

Further, with the third embodiment of the present invention, it is determined whether or not exposure is carried out at a short distance side (shallow depth of field region), and when the release button is pressed down fully focus adjustment using phase difference AF is not executed, which means that it is possible to perform focus adjustment with a small time lag and with high precision.

With the first to third embodiments of the present invention, subject light flux is switched between a viewfinder optical system and an image sensor by moving a movable mirror 201 up and down, but this is not limiting, and it is also possible to divide subject light mirror by arranging a half-mirror. Also, focus precision using phase difference AF is made about the same as at the time of second focus display using high precision contrast AF, but this is not limiting and it is also possible to make either focusing precision higher precision. However, focus precision using phase difference AF is made higher precision than the precision at the time of first focus display in the high speed contrast AF.

Also, in the first to third embodiments of the present invention, description has been given for an example where a single lens reflex is adopted as the digital camera, but the present invention camera can be applied to an image sensor of a digital camera or the like that performs live view display, and can perform focus control by switching contrast AF and phase difference AF.

Description has been given above of first to third embodiments of the present invention, but the present invention is not limited to these embodiment, and structural elements may be modified in actual implementation within the scope of the gist of the embodiments. It is also possible form various inventions by suitably combining the plurality of structural elements disclosed in the above describe embodiments. For example, it is possible to omit some of the structural elements shown in the embodiments.

What is claimed is:

1. An imaging device, comprising:
   an imaging unit for receiving subject light flux made incident by a photographing lens on an image forming surface, and subjecting the imaged subject image to photoelectric conversion to output subject image data;
   a display unit for carrying out a live view display operation using subject image data acquired by the imaging unit;
   a first contrast autofocus unit for obtaining contrast information of a subject image from the subject image data, and guiding the photographing lens into a first in-focus permissible range based on the contrast information;
   a phase difference autofocus unit for moving a mirror member in an optical path of the photographing lens or arranging the mirror member there, receiving the subject light flux reflected by the mirror member and detecting a defocus amount of the photographing lens by a phase difference method, and guiding the photographing lens into a second in-focus permissible range according to the detection results;
   a release button having a two stage operating structure, of a half pressed operation and a fully pressed operation; and
   a control unit for, when the release button has been pressed down halfway during execution of the live view display operation, executing a focus adjustment operation using the first contrast autofocus unit, and after that, when the release button has been pressed fully, executing a focus adjustment operation using the phase difference autofocus unit.

2. The imaging device of claim 1, further comprising:

a second contrast autofocus unit for obtaining further contrast information of a subject image from the subject image data, and guiding the photographing lens into a third in-focus permissible range based on the further contrast information.

3. The imaging device of claim 2, wherein:

the control unit performs control so that when the release button has been pressed down halfway, a focus adjustment operation is executed using the first contrast autofocus unit, and if, at a point in time where the first focus adjustment operation is completed, the release button continues to be pressed halfway, and is not pressed down fully, a focus adjustment operation is executed using the second contrast autofocus unit.

4. The imaging device of claim 3, wherein:

the control unit performs control so that when the release button is pressed fully during execution of a focus adjustment operation using the second contrast autofocus unit, this focus adjustment operation is stopped, and a focus adjustment operation is executed using the phase difference autofocus unit.

5. The imaging device of claim 3, wherein:

the control unit performs control so that when the release button is pressed fully after completion of a focus adjustment operation using the second contrast autofocus unit, a shooting operation is executed without executing a focus adjustment operation using the phase difference autofocus unit.

6. The imaging device of claim 2, further comprising:

a selection section for selecting a first focus adjustment mode for carrying out a focus adjustment operation using a combination of the first contrast autofocus unit and the phase difference autofocus unit, and a second focus adjustment mode for carrying out a focus adjustment operation using a combination of the first contrast autofocus unit and the second contrast autofocus unit.

7. The imaging device of claim 6, wherein:

when the selection section is selecting the first focus adjustment mode, the control unit performs control so that if the release button has been pressed down halfway a focus adjustment operation is carried out using the first contrast autofocus unit, and if the release button has been pressed down fully, a focus adjustment operation is carried out using the phase difference AF unit, and when the selection section is selecting the second focus adjustment mode, the control unit performs control so that if the release button has been pressed down halfway a focus adjustment operation is carried out using the first contrast autofocus unit, and if the release button has been pressed down fully, a focus adjustment operation is carried out using the second contrast autofocus unit.

8. The imaging device of claim 6, further comprising:

a determination section for determining whether or not the photographing lens has been focused in a region of shallow depth of field, and wherein the selection section selects the first focus adjustment mode or the second focus adjustment mode based on results of determination by the determination section.

9. The imaging device of claim 8, wherein:

when the determination section has determined that the photographing lens is focused in a region of shallow depth of field, the selection section selects the second focus adjustment mode.

10. The imaging device of claim 9, wherein:

the control unit performs control so that until completion of the focus adjustment operation using the second contrast autofocus unit, there is no transition to a shooting operation, even if the release button is pressed down fully.

11. The imaging device of claim 8, wherein:

a region of shallow depth of field is determined (A) by comparing image magnification of the photographing lens with a specified magnification ratio, or comparing the subject distance of the photographing lens with a specified distance, when focus is carried out at a short distance side a region of shallow depth of field is determined, or (B) when the photographing lens is a macro lens or the exposure mode is macro mode.

12. The imaging device of claim 2, wherein:

the display unit is capable of enlarged live view display to perform live view display by cropping a range of part of subject image data; and the first contrast autofocus unit and the second contrast autofocus unit carry out focus adjustment based on contrast information of the subject image data cropped during the enlarged live view display.

13. The imaging device of claim 12, wherein:

the phase difference autofocus unit has a sensor for detecting defocus amount of the photographing lens by a phase difference method for a plurality of points within an exposure screen; and during the enlarged live view display, the phase difference autofocus unit carries out focus adjustment based on the sensor, included in the exposure screen being enlarged displayed.

14. The imaging device of claim 12, wherein:

the control unit causes a focus adjustment using the first contrast autofocus unit based on contrast information of the cropped subject image data if the release button is operated halfway during the enlarged live view display, and causes a focus adjustment using the second contrast autofocus unit based on contrast information of the cropped subject image data if the release button is operated fully.

15. The imaging device of claim 2, wherein:

the second in-focus permissible range and the third in-focus permissible range are substantially equal, and the first in-focus permissible range is wider than the third in-focus permissible range.

16. The imaging device of claim 15, wherein:

the first in-focus permissible range is determined based on display resolution of the display unit or the display dot size of the display unit, and the second in-focus permissible range and the third in-focus permissible range are determined based on the image resolution of the imaging unit or the cell size of the imaging surface.

17. A control method for an imaging device for imaging a subject, comprising:

imaging a subject;

subjecting a formed subject image to live view display;

guiding the photographing lens to a first in-focus permissible range based on contrast information of the subject image in response to an exposure preparation operation; and guiding the photographing lens to a second in-focus permissible range based on a defocus amount of the photographing in response to a shooting operation.

18. A control method for an imaging device for imaging a subject, comprising:

forming a subject image;

subjecting a formed subject image to live view display;

guiding the photographing lens to a first in-focus permissible range based on contrast information of the subject image in response to an exposure preparation operation; and guiding the photographing lens to a second in-focus permissible range based on contrast information of the subject image if an exposure preparation operation continues and a shooting operation is not performed.

19. The imaging device of claim 18, wherein:

if the shooting operation is instructed midway through guiding the photographing lens to the second in-focus permissible range, the operation to guide the photographing lens to the second in-focus permissible range is stopped, and the photographing lens is guided to a third in-focus permissible range based on defocus information for the photographing lens.

20. A control method for the imaging device of claim 19, wherein:

the second in-focus permissible range and the third in-focus permissible range are substantially equal, and the first in-focus permissible range is wider than the third in-focus permissible range.

21. The control method for the imaging device of claim 20, wherein:

the first in-focus permissible range is determined based on display resolution or display dot size, and the second in-focus permissible range and the third in-focus permissible range are determined using imaging resolution or imaging size.

22. The control method for the imaging device of claim 18, wherein:

in the case of a region of shallow depth of field, the photographing lens is guided to the second in-focus permissible range based on contrast information of the subject image in response to an exposure preparation operation; and in the case of a region of deep depth of field, the photographing lens is guided to the third in-focus permissible range based on defocus information of the photographing lens in response to an exposure preparation operation.

23. The control method for the imaging device of claim 18, wherein:

the first in-focus permissible range is wider than the second in-focus permissible range.

24. A control method for an imaging device for imaging a subject, comprising:

forming a subject image;

cropping a range of part of the imaged subject and performing enlarged live view display;

guiding the photographing lens to a first in-focus permissible range based on contrast information of the subject image for the cropped section in response to an exposure preparation operation; and if the exposure preparation operation continues and a shooting operation is not instructed, guiding the photographing lens to a second in-focus permissible range based on contrast information of the subject image for the cropped section.

25. The control method for the imaging device of claim 24, wherein:

if the shooting operation is instructed midway through guiding the photographing lens to the second in-focus permissible range, the operation to guide the photographing lens to the second in-focus permissible range is stopped, and the photographing lens is guided to the third in-focus permissible range based on defocus information for points contained in the range of the cropped portion.

* * * * *